(12) United States Patent
Richter et al.

(10) Patent No.: US 7,631,852 B2
(45) Date of Patent: Dec. 15, 2009

(54) NORMALLY DOUBLE-CLOSED MICROVALVE

(75) Inventors: Martin Richter, Munich (DE); Juergen Kruckow, Munich (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 245 days.

(21) Appl. No.: 11/223,828

(22) Filed: Sep. 9, 2005

(65) Prior Publication Data

US 2006/0027772 A1 Feb. 9, 2006

Related U.S. Application Data

(63) Continuation of application No. PCT/EP03/02491, filed on Aug. 11, 2003.

(51) Int. Cl.
*F16K 31/126* (2006.01)
*F04B 17/00* (2006.01)

(52) U.S. Cl. .................. 251/61.1; 251/129.06; 417/322; 417/413.3

(58) Field of Classification Search .............. 417/413.3, 417/322; 251/129.06, 61, 61.1
See application file for complete search history.

(56) References Cited

U.S. PATENT DOCUMENTS

| | | | | |
|---|---|---|---|---|
| 4,911,616 A | * | 3/1990 | Laumann, Jr. ............ | 417/413.3 |
| 6,227,824 B1 | * | 5/2001 | Stehr ........................ | 417/540 |
| 6,390,791 B1 | * | 5/2002 | Maillefer et al. .......... | 417/413.3 |
| 6,488,652 B1 | * | 12/2002 | Weijand et al. ........... | 604/93.01 |
| 6,554,591 B1 | * | 4/2003 | Dai et al. ................... | 417/505 |
| 7,025,324 B1 | * | 4/2006 | Slocum et al. ............. | 251/11 |
| 7,032,608 B2 | * | 4/2006 | Koeneman et al. ........ | 137/15.18 |
| 2003/0141473 A1 | * | 7/2003 | Pelrine et al. ............. | 251/129.06 |

\* cited by examiner

*Primary Examiner*—Devon C Kramer
*Assistant Examiner*—Leonard J Weinstein
(74) *Attorney, Agent, or Firm*—Daniel J. Santos

(57) ABSTRACT

A normally closed microvalve includes a fluid inlet, a fluid outlet, a deflectable closing element, which, in the closed state of the microvalve, is seated on a sealing lip, such that the fluid inlet is fluidically disconnected from the fluid outlet, and in the opened state of the microvalve, is spaced apart from the sealing lip, and a deflectable holding structure which is connected to the closing element such that, between the same, a space exists, which is in fluidic communication to the fluid outlet. An influence of a force onto the holding structure and the closing element in a first direction provides an opening-action to the microvalve, while an influence of a force onto the holding structure and the closing element in a second direction provides a closing-action. The fluid inlet and the closing element are arranged such that a pressure at the fluid inlet exerts a force in the second direction. An effective surface of the holding structure, which, when a pressure is applied to the fluid outlet, causes a force in the second direction, is greater than an effective surface of the closing element, which, when a pressure is applied to the fluid outlet, causes a force in the first direction.

17 Claims, 16 Drawing Sheets

(STATE OF ART)

(STATE OF ART)

(STATE OF ART)

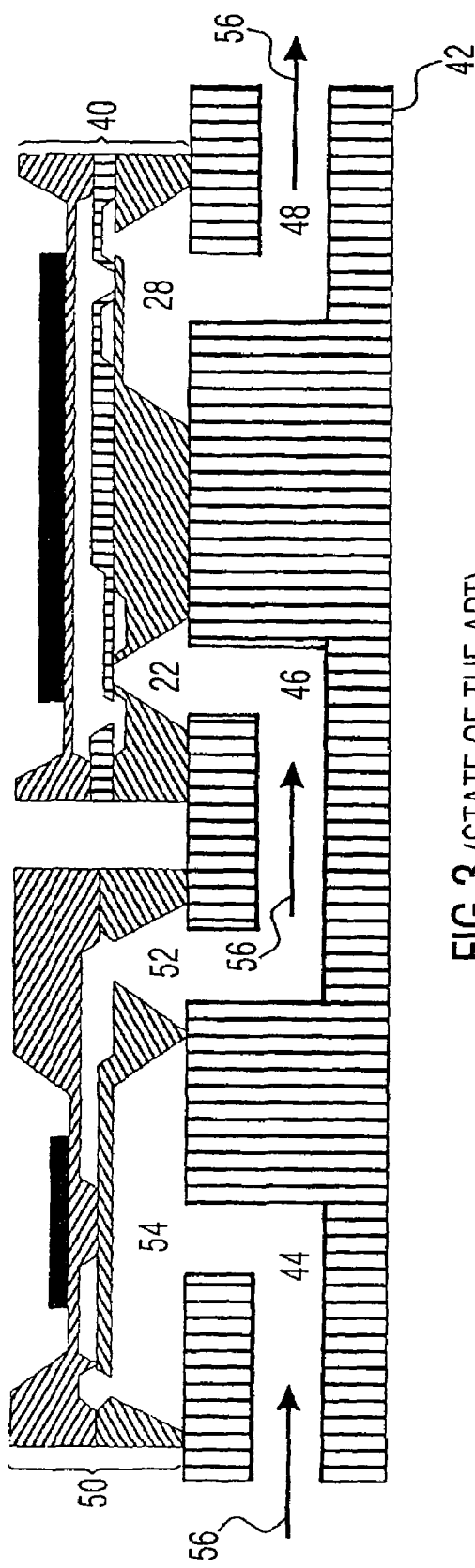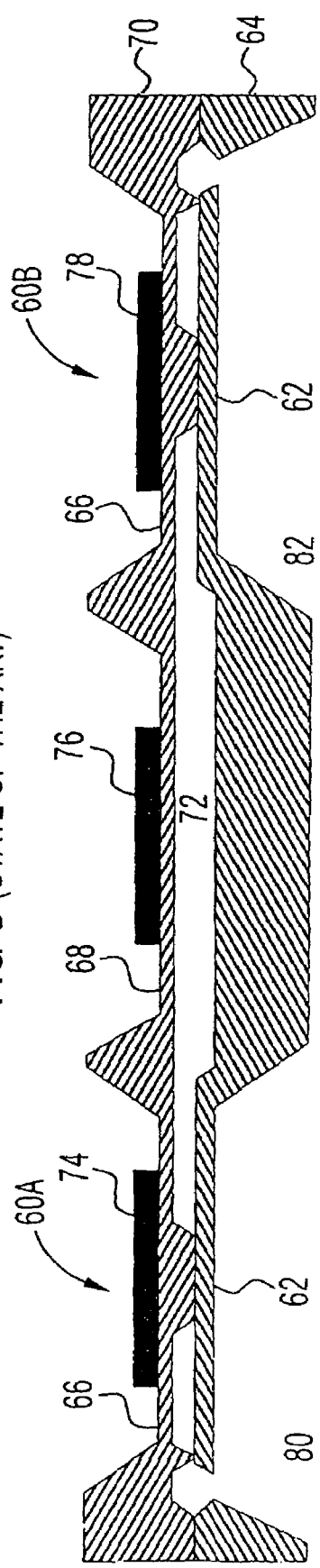

(STATE OF THE ART)

(STATE OF THE ART)

(STATE OF THE ART)

(STATE OF THE ART)

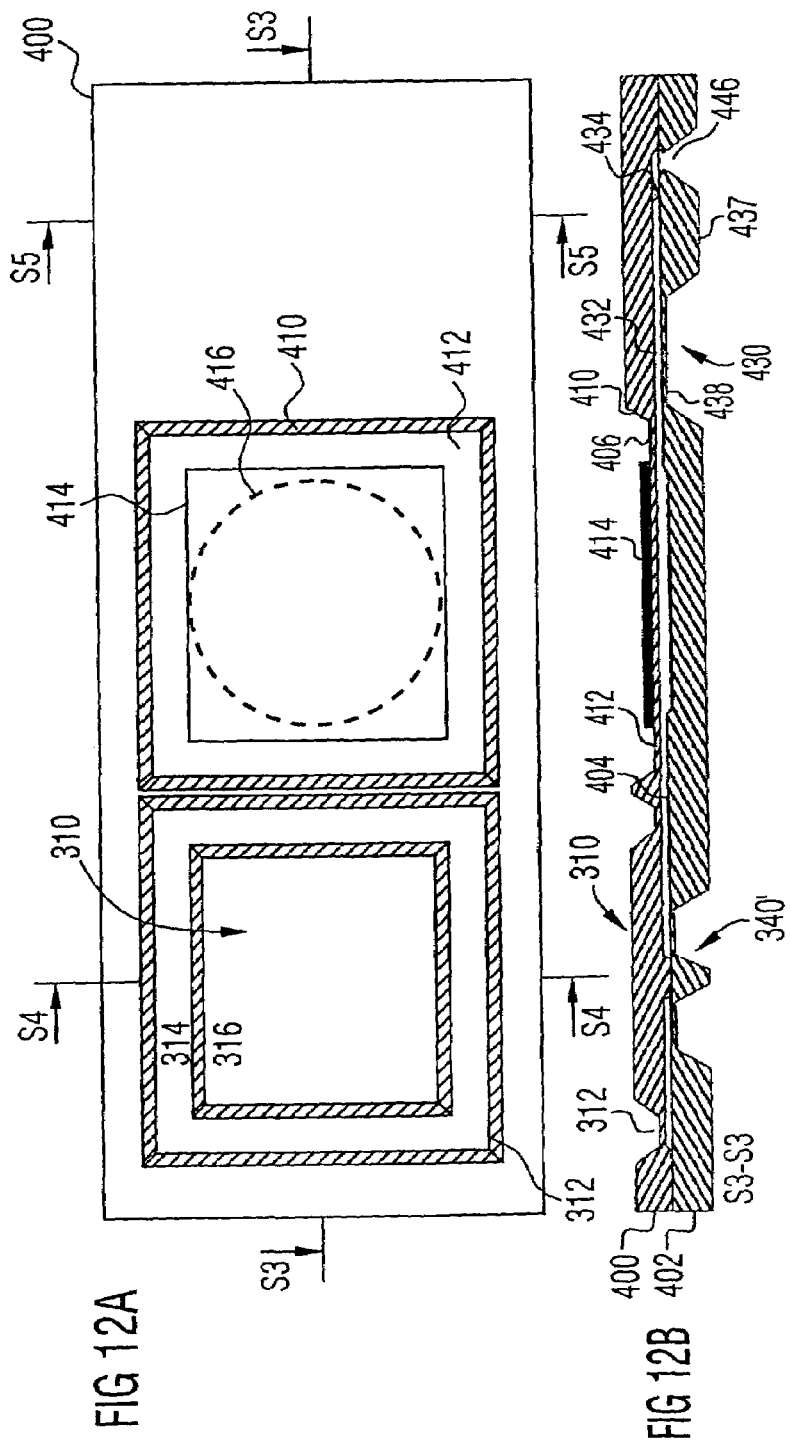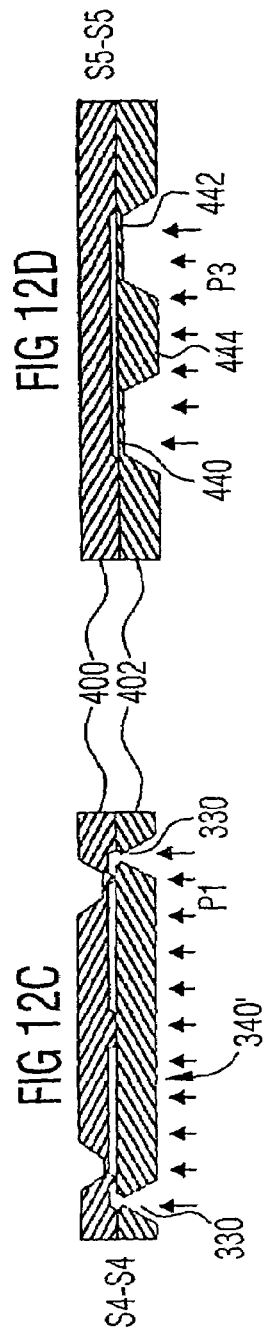

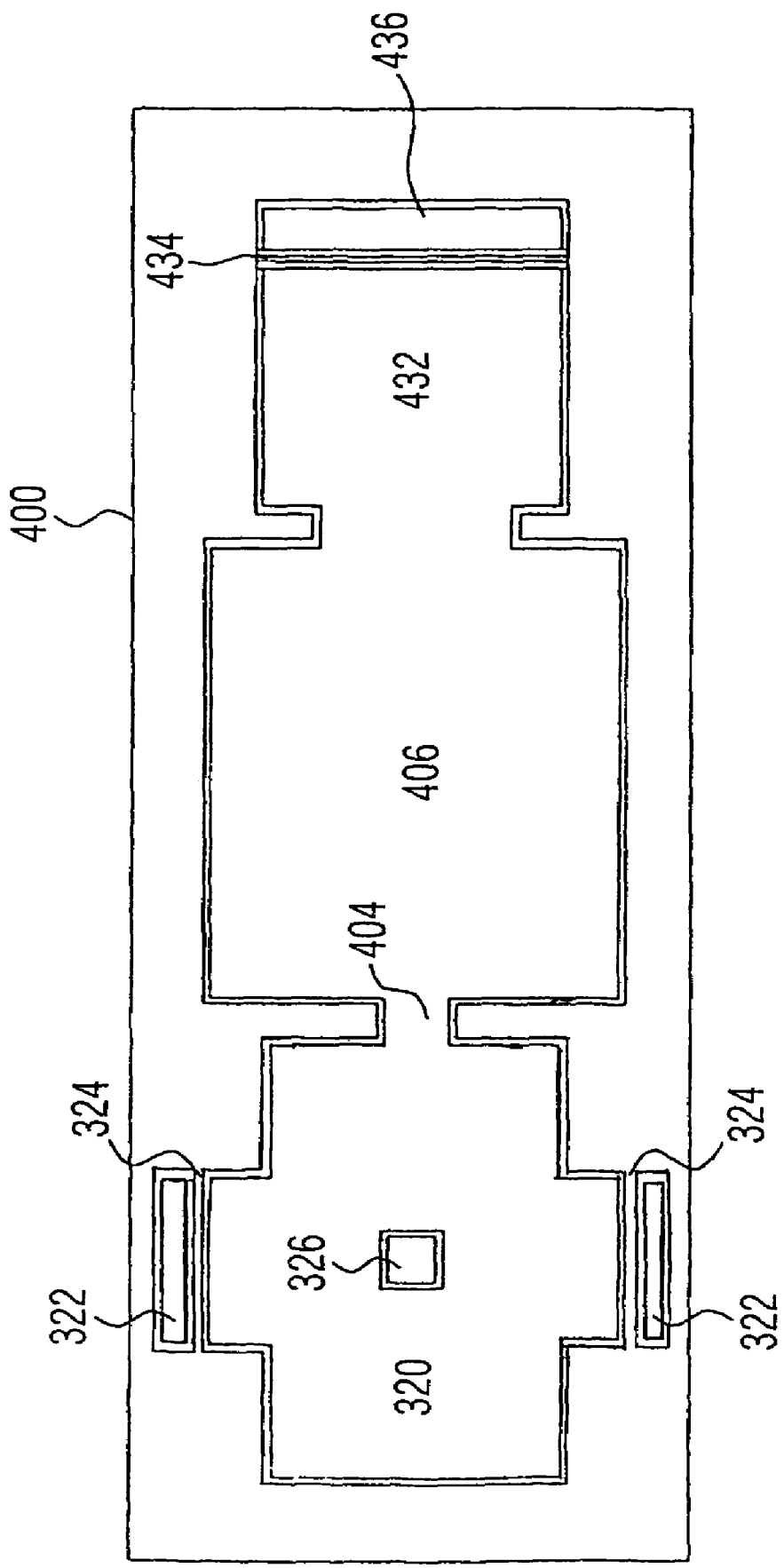

NORMALLY DOUBLE-CLOSED MICROVALVE

CROSS-REFERENCE TO RELATED APPLICATION

This application is a continuation of copending International Application No. PCT/EP03/02491, filed on Mar. 11, 2003, which designated the United States and was not published in English and is incorporated herein by reference in its entirety.

BACKGROUND OF THE INVENTION

1. Field of the Invention

The present invention relates to a normally closed microvalve and, in particular, to such a microvalve providing self-locking action both in case of an overpressure at a fluid inlet of the same and at a fluid outlet of the same. Such a microvalve may be referred to as a normally double-closed microvalve. Such a microvalve is said to be especially suitable for use as an inlet valve in a micropump.

2. Description of the Related Art

From the state of the art, micropumps having passive and active microvalves at the pump inlet and pump outlet are known.

A prior art micropump with passive non-return valves at the pump inlet and pump outlet is for example known from DE-A-19719862 and is shown herein in FIG. 1a to 1c. This pump includes a pump diaphragm wafer 10, in which a pump diaphragm 12 is structured, on which a piezoelectric actuator 14 is provided. Further, the pump includes a first valve wafer 16, in which a valve flap and a valve seat are structured. Further, a second valve wafer 18 is provided, in which a second valve flap and a second valve seat are structured. In the inventive micro-diaphragm pump the three wafers are bonded such that a first non-return valve 20 is deposited between an inlet 22 and a pump chamber 24, and a second non-return valve 26 is deposited between the pump chamber 24 and an outlet 28.

As is shown in FIG. 1b, during a suction stroke, the piezoelectric actuator 14 draws the diaphragm 12 upwards, such that, by means of the negative pressure resulting in the pump chamber 24, a fluid flow occurs through the non-return valve 20 from the inlet 22 in the pump chamber 24.

In a succeeding pressure stroke, the piezoelectric actuator 14 moves the diaphragm 12 downwards, such that, by means of the positive pressure resulting in the pump chamber 24, a fluid flow occurs through the non-return valve 26 in the outlet 28, as is shown in FIG. 1c. As regards further details of such a micropump with passive non-return valves, reference is made to DE-A-19719862 mentioned above.

What is disadvantageous about a micropump with passive non-return valves of the kind described above is that, if a positive pressure is present at inlet 22, the non-return valves 20 and 26 open up, such that an undesired flow, a so-called free-flow, may occur through the pump.

In a multitude of applications, however, such a free-flow is undesired and/or even forbidden. Such applications include any application, the operating conditions of which enable a positive pressure at the inlet and in which, nonetheless, no free-flow is to take place. Applications, in which such a free-flow needs to be avoided in the currentless (non-energized) state, exist, for example, in the field of medical technology or fuel cells.

A further disadvantage of the micropump shown in FIG. 1a to 1c consist in that, for realizing this micropump in a layer-structure, at least three layers are needed, namely the pump diaphragm layer 10 and the two valve layers 16 and 18.

In order to avoid such an undesired free-flow, a number of approaches existed in the state of art. For example, non-return valves were developed, which are biased into the closed position, for example by an appropriate coating on the valve flap. Here, the disadvantage is that, for this purpose, complex processes are required, with appropriate coatings being difficult to realize, especially with the resulting requirements made on a dense wafer connection process. While such biased non-return valves are normally closed, they open at a threshold pressure, i.e. when the inlet pressure exceeds a certain value, such that, by means of such non-return valves, a free-flow may not be excluded in a reliable manner.

Furthermore, it is known from the state of the art, that a normally closed microvalve (a microvalve closed in the non-actuated state) is installed ahead of the inlet of a micro-diaphragm pump with passive non-return valves. Such a solution, as is shown herein in FIG. 2, is disclosed in WO-A-02/27194.

The structure shown in FIG. 2 includes a micro-diaphragm pump 40 with passive non-return valves, as is described above referring to FIG. 1a to 1c. Further, the structure shown there includes a carrier substrate 42 with fluid channels 44, 46 and 48 formed therein. The fluid channel 48 is in fluidic communication to the outlet 28 of the micro-diaphragm pump 40, while the fluid-channel 46 is in fluidic communication to the inlet 22 of the micro-diaphragm pump. The structure shown in FIG. 2 further includes a normally closed microvalve 50, the outlet 52 of which is in fluidic communication to the fluid channel 46 and thus to the inlet 22 of the micro-diaphragm pump 40, and the inlet 54 of which is in fluidic communication to the fluid channel 44. In FIG. 2 the pumping direction is shown by means of arrows 56. As regards the structure of the normally closed microvalve 50, reference is made to the disclosure of WO-A-02/27194 and further to the following description of FIG. 4a to 4d.

A disadvantage of the FIG. 2 solution of a series-connection between a micropump 40 with passive non-return valves and a normally closed microvalve 50 is the necessary separate component making this solution costly and complex.

Furthermore, micro-peristaltic pumps with integrated active, normally opened valves are known from the state of the art. The advantage of such micro-peristaltic pumps consists in that active closing of the flow path is possible. These pumps, however, are disadvantageous in that they do not lock in the currentless state, since the valves are open in the non-actuated state. Furthermore, peristaltic pumps provide the general disadvantage that several drive elements are needed.

From the above-mentioned WO-A-02/27194 micro-peristaltic pumps with active valves at the inlet and at the outlet are known. Such a micro-peristaltic pump is shown in FIG. 3.

The micro-peristaltic pump shown in FIG. 3 includes two oppositely deposited normally closed valves 60a and 60b. The valve flaps 62 of the normally closed valves 60a and 60b are integrated within a valve flap chip 64. Actuator diaphragms 66 of the two valves 60a and 60b in addition to a pump diaphragm 68 are integrated within a diaphragm chip 70. The chips 64 and 70 are structured to define a pump chamber 72 between the same. On the actuator diaphragms 66 and the pump diaphragm 68, piezoelectric actuators 74, 76 and 78 are provided respectively. The voltages applied to the piezoelectric actuators 74, 76, 78 may be suitably controlled to implement a peristaltic pumping action from the inlet 80 via the pump chamber 72 to the outlet 82. As regards further details of the peristaltic micropump shown in FIG. 3, reference is again made to the disclosure of WO-A-02/27194.

A disadvantage of the micro-peristaltic pump shown in FIG. 3 is, in addition to the requirement of several drive elements, that, in case of great pressure differences during the pressure stroke, the inlet valve cannot be held in a closed state.

A normally closed microvalve, as is respectively used at the inlet of the prior art pumps shown in FIGS. 2 and 3, will be explained in detail below with reference to FIG. 4a to 4d. Further, the disclosure of WO-A-02/27194 regarding the structure and functionality of such a normally closed valve is herewith incorporated.

FIG. 4a shows a bottom view of an actuator chip 100 of the valve, FIG. 4b shows a sectional view along the line x-x in FIG. 4a in the non-actuated state, 4c shows a sectional view along the line x-x in FIG. 4a in the actuated state, and FIG. 4d shows a plan view of a flap chip 102 of the valve. It should be appreciated, that the Figures herein show exemplary structures with chamfered surfaces, as they occur in KOH-etching of silicon substrates, however, with the structures shown allowing to be manufactured in different ways without any chamfered surfaces.

On a first main side 104, the actor chip 100 comprises a depression and/or recess 106, while, on an opposing main side 108, a depression and/or recess 110 is provided. Through the two depressions 106 and 110, an actuator diaphragm 112 is formed. On one side of the actuator diaphragm 112, a piezoelectric ceramic 114 is provided, while a plunger 116 projects on the opposing side of the actuator diaphragm 112. In FIG. 4a, the plunger 116, the depression 110, and, in dotted line, the area of the depression which forms the actuator diaphragm 112 is shown.

The actuator diaphragm 112 and the plunger 116 are formed essentially in a square shape in the lateral direction and are furthermore deposited in a centric arrangement. Further, it can be seen in FIG. 4a, that the diaphragm 112 is surrounded by a sealing lip 120 along three of its four sides and/or edge sections. As can be best seen in FIGS. 4b and 4c, the sealing 120 is formed on the side 108 of the actuator chip 100 and is preferably structured at the same time with the plunger 116. The flap chip 102 is connected to the actuator chip 100 and includes an outlet area 130 and an inlet channel area 140. The outlet area 130 includes an outlet opening 132 completely penetrating the flap chip 102, while the inlet channel area 140 includes an inlet opening 142, which completely penetrates the flap chip 102 as well. The inlet channel area 140 is formed by means of a depression in the second main side of the flap chip 102, which extends up to a closing flap and/or a flap diaphragm 150.

The closing flap 150, as is shown in FIG. 4d, is formed in a square shape and is freely moveable on three from four of its sides and/or edges by the inlet opening 142 relative to remainder of the flap chip 102, while the same being mounted and/or fixed to the fourth side. The valve flap 150, along its lateral expansion, extends a bit beyond the lateral expansion of the sealing lip 120, such that the inlet opening 142 and the inlet channel area 140 in the normally closed state of the valve are laterally limited by the flap chip 102 and against the outlet area 130 by the valve flap 150, the sealing lip 120, and a part of the depression 110 surrounding the sealing lip 120.

In the normally closed valve shown in FIG. 4a to 4d the closing flap 150 is deposited such that the lateral dimensions of the closing flap 150 are greater than the surrounding sealing lip 120 of the actuator chip 102, and that the inlet pressure exerted by a fluid to be switched in the inlet channel area 140 onto the closing flap 150 adjoining the inlet channel area 140, provides a closing action. Without applying any voltage to the piezoelectric ceramics 114 and, therefore, without applying any pressure to the closing flap 150, the closing flap is consequently closed. For opening the valve, a voltage, which is positive into the polarization direction, is applied to the silicon-piezo bending converter, which is formed by the piezoelectric ceramics 114 and the diaphragm 112, as a result of which the silicon-piezo bending converter, together with the plunger 116 pushes open the closing flap 150 against the inlet pressure, see FIG. 4c. More precisely, the diaphragm 112 together with the plunger 116 is moved into the direction of the valve flap 150 by means of the positive voltage applied in polarization direction to the piezoelectric ceramics 114, with the valve flap bending open owing to the pressure of the plunger 116 and forming a space 152 between itself and the sealing lip 120.

The self-locking active microvalve described above with reference to FIG. 4a to 4d, has the quality of locking when a positive pressure is applied to the inlet 140. A reference pressure acting onto the diaphragm 112 from the opposing side of the valve flap 150 and which is typically the atmospheric pressure tends to provide an opening action for the microvalve. Further, it has turned out that in the microvalve described in WO-A-02/27194, a positive pressure at the outlet 130 tends to provide an opening action to the valve. If, therefore, this valve is used as a sole inlet valve of a micropump, with the output 130 being in a fluidic communication to the pump chamber of the micropump, a return-flow may occur through the inlet valve during a pumping phase, during which a positive pressure prevails in the pump chamber.

SUMMARY OF THE INVENTION

It is the object of the present invention to provide a microvalve which is capable of providing a self-locking action both in case of a positive pressure at the outlet and at the inlet.

The present invention provides a normally closed microvalve, having a fluid inlet; a fluid outlet; a deflectable closing element, which, in the closed state of the microvalve, is seated on a sealing lip, such that the fluid inlet is fluidically disconnected from the fluid outlet, and, in the opened state of the microvalve, is spaced apart from the sealing lip; and a deflectable holding structure, which is connected to the closing element, such that, between the same, a space exists, which is in fluidic communication to the fluid outlet, wherein an influence of force onto the holding structure and the closing element in a first direction provides an opening action, and an influence of force onto the holding structure and the closing element in a second direction provides a closing action, with the fluid inlet and the closing element being arranged such that a pressure at the fluid inlet exerts a force into the second direction, characterized in that an effective area of the holding structure, which, when a pressure is applied to the fluid outlet, exerts a force into the second direction, is greater than an effective area of the closing element, which, when a pressure is applied to the fluid outlet, causes a force in the first direction, and that the deflectable holding structure comprises a stiffened diaphragm structure.

The present invention provides a normally closed microvalve, which provides a self-locking action in both directions, i.e. in which both a pressure at the inlet and a pressure at the outlet exert a force onto the closing element and the holding structure, which provides a closing action. The issue whether, during such a pressure at the inlet and/or outlet, the microvalve remains in fact closed, depends on all of the three involved pressures, i.e. the inlet pressure, the outlet pressure, and the reference pressure (as a rule, the atmospheric pressure), as will be further discussed in the detailed description herein below. An actual closing is always given, if a positive pressure, prevails as against the other two pressures at the inlet and/or at the outlet.

The inventive normally closed microvalve is especially suitable for use as a passive inlet valve in a micropump, with the outlet of the microvalve being in fluidic communication to the pump chamber and the inlet of the microvalve representing the inlet of the micropump. In such a case, when a positive pressure is present at the inlet of the micropump and, further, when a positive pressure is present in the pump chamber, as it prevails during a pumping phase, the microvalve will lock. The passive microvalve will open when applying a negative pressure at the outlet side, as it prevails in the pressure chamber in case of a suction stroke.

At first the inventive passive microvalve is based on a self-locking active microvalve as is described in WO-A-02/27194. This self-locking active microvalve has the quality of locking when applying a positive pressure to the inlet, while a reference pressure acting on the side of the actuator diaphragm 112 spaced from the valve flap 150, has the tendency of providing an opening action. As a rule the reference pressure will be the atmospheric pressure, but may be also any other pressure, if corresponding precautions have been taken such that the pressure different from the atmospheric pressure is exerted onto the top side of the actuator diaphragm. As has been specified above, the inlet pressure has the tendency of providing a closing action onto the valve flap, while the outlet pressure in the valve chamber formed between the actuator diaphragm 112 and the valve flap 150 acts in both directions, i.e. provides an opening and closing action. In the self-locking microvalve described in WO-A-02/27194, the sealing lip 120 runs on three sides around the valve flap 160, with the sealing lip 120 being formed in the non-moving part of the element 100, which contains the actuator diaphragm 112, which is in contact to the reference pressure. Thus, in this self-locking microvalve, the effective surface onto which the outlet pressure acts in a downward direction is greater than the effective surface onto which the same acts in an upward direction, i.e. in direction of the diaphragm being in contact with the reference pressure. If, therefore, a positive pressure is applied to the outlet 130, maybe during the pressure stroke of a pumping cycle, this positive pressure provides an opening action onto the composition consisting of actuator diaphragm 112 and valve flap 150. If a negative pressure is applied to the outlet 130, the same provides a closing action to the valve. It has thus been found out that, in the currentless state, the active self-locking valve of WO-A-02/27194 shows exactly the reverse properties than those required to serve as a passive non-return valve for the inlet of a micro-diaphragm pump.

The cause for the closing motion and opening motion of the microvalve is the balance of forces acting on the diaphragm-flap composition. In the inventive microvalve, the effective surface onto which the outlet pressure acts in a downward direction is smaller than the effective surface onto which the same acts in an upward direction. Thus, a pressure at the outlet always results in a net force in one closing direction such that a pressure at the outlet leads to the closing of the valve, unless such a closing is prevented by the two other pressures, the inlet pressure and the reference pressure.

Preferably, the inventive, normally closed microvalve is implemented as a passive microvalve, in which no active actuation element is provided for the holding structure. Alternatively, the inventive microvalve, however, may also be implemented as a microvalve with active actuation of the holding structure, with the same still having the self-locking action in the non-zero state, when a positive pressure is present at the outlet.

In accordance with the invention, the holding structure is preferably implemented as a stiffened or non-stiffened, circumferentially fixed diaphragm structure in a first layer element. Preferably, the deflectable closing element is implemented in a second layer element as a stiffened or non-stiffened diaphragm structure fixed at one or two sides thereof. The deflectable holding structure and the deflectable closing element are preferably fixedly connected to each other via a plunger-like connection piece connecting a central area of the holding structure to a central area of the closing element in order to keep any torque forces at a minimum.

Further, in addition to the closing element and the holding structure, the remaining elements of the inventive microvalve are preferably also structured in the first and/or second layer element.

In a preferred embodiment, the closing element is a stiffened diaphragm structure fixed at two sides thereof with the microvalve comprising a fluid inlet at each non-fixed side of the closing element. Preferably, an outlet opening is provided at each fixed side of the closing element.

The present invention further provides a micropump in which an inventive microvalve is used as an inlet valve. Such a micropump may also be implemented using only two structured layers, with the fluid outlet of the microvalve then being directly connected to the pump chamber of the micropump by means of a corresponding structuring of the two layers. The outlet valve of such a micropump may then be realized by any conventional non-return valve.

Such an inventive micropump comprises numerous advantages. Since the microvalve provides, in the non-zero state, a self-locking action in both directions, the micropump does not allow any undesired free-flow through the same. As mentioned above, only two layers are necessary for building such a micropump, such that only one joining step is required. Further, the inventive micropump does not show any great valve sumps, such that a great compression ratio may be achieved. Any functions of the inventive micropump may be achieved by means of an actuator element. Thus, the micropump saves power, which is especially important for energy-critical applications, such as e.g. implantable micropumps.

BRIEF DESCRIPTION OF THE DRAWINGS

Preferred embodiments of the present invention will be explained in detail below with reference to the attached drawings, in which:

FIG. 2 shows a schematic cross-sectional view of a prior art micro-diaphragm pump with an additional active inlet valve;

FIG. 3 shows a schematic cross-sectional view of a prior art micro-peristaltic pump;

FIG. 12a to 12e show schematic views of an inventive micropump.

DESCRIPTION OF THE PREFERRED EMBODIMENTS

Figure 4A:
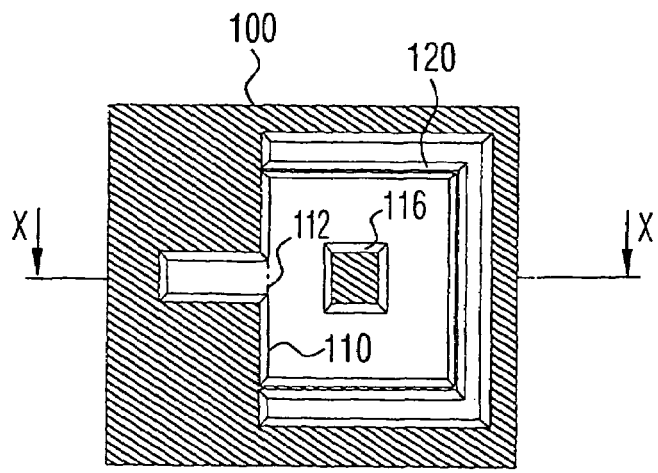
FIG. 4a to 4d show schematic views for explaining a prior art microvalve.
Figure 4B:
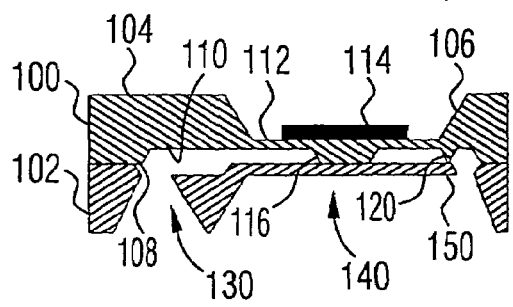
Figure 4C:
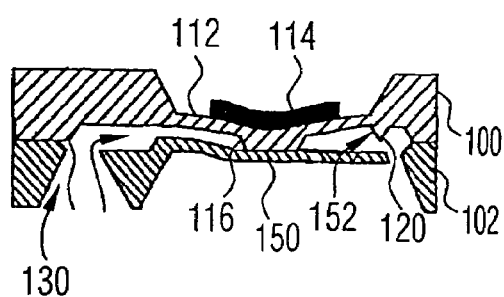
Figure 4D:
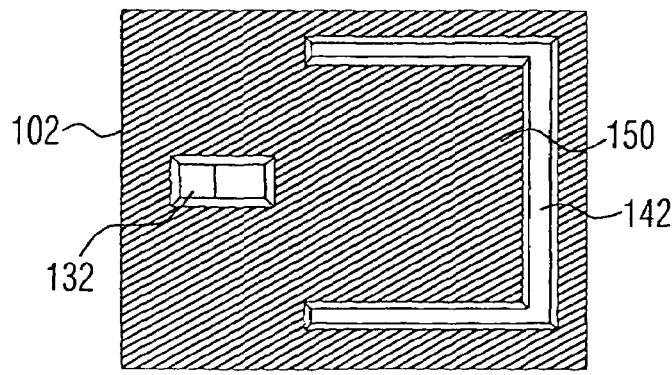
Figure 5:
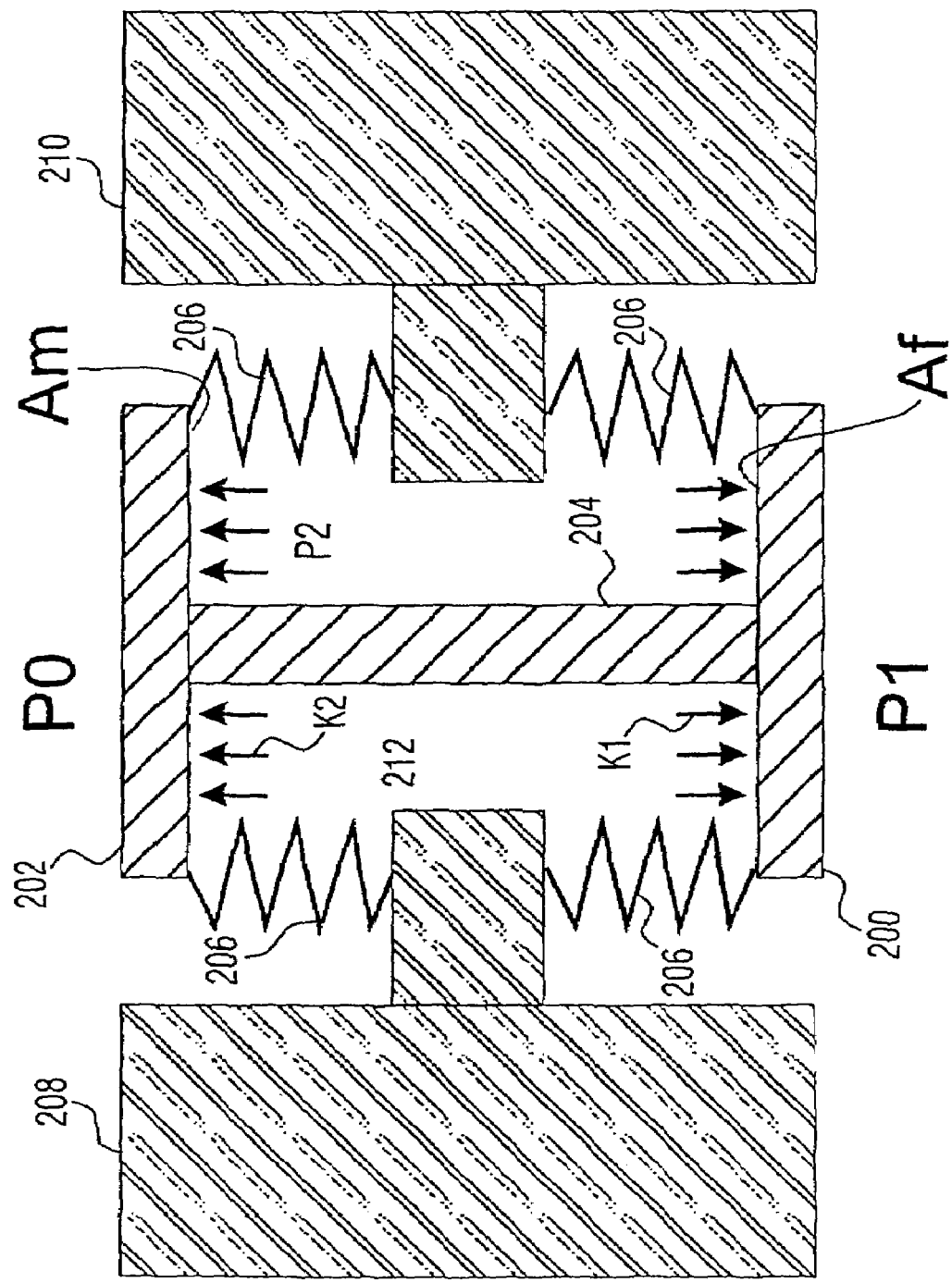
FIG. 5 shows a schematic illustration for explaining the relations of forces of an inventive microvalve.

Before elaborating on preferred embodiments of the present invention, reference is made to FIG. 5 to explain the forces which act on the composition of holding structure and closing element depending on an outlet pressure. As is shown in FIG. 5, in the inventive microvalve and the valve in accordance with WO-A-02/27194, a closing element 200, a holding structure 202 and a connection piece 204 represent an I-structure. As is schematically indicated in FIG. 5 by the strings 206, this I-structure is resiliently mounted to the stationary areas of the actuator chip 100 and the flap chip 102 (see FIGS. 4b and 4c), which, in FIG. 5, are provided with reference numbers 208 and 210. The resilient mounting results, for example, from diaphragm structures which each connect different areas of the moveable structures to the stationary areas. The so generated interior area 212 is in fluidic communication to the fluid outlet such that a pressure P2 prevailing at the fluid outlet is present in the same.

A reference pressure P0, which, as a rule, is the atmospheric pressure, acts from the opposing side of the interior area onto the deflectable holding structure 202. The inlet pressure P1 acts from the opposing side of the interior area onto the deflectable closing element 200. The deflectable holding structure 202 has an effective surface Am, onto which the pressure P2 acts. The deflectable closing element 200 has an effective surface $A_f$ onto which the pressure P2 acts.

The approach based on the present invention now consists in designing the flap-diaphragm composition, which is schematically shown as I-structure in FIG. 5, such that the valve closes at a positive pressure at the outlet and opens at a negative pressure at the outlet. Moreover, the valve is to remain self-locking when a positive pressure is applied to the inlet.

It should be noted that the considerations herein assume that the motion direction of the I-structure (upwards or downwards) is not influenced by the respective suspensions of the holding structure and the closing element, but is only influenced by the net force. Assuming that the surfaces onto which P1 acts from the outside and P2 acts from the inside onto the closing element 200, are equal and that the surfaces, onto which P0 acts from the outside and P2 acts from the inside onto the holding structure 202, are equal (neglecting the surface in the interior occupied by the connection piece 204), this net force may be calculated as follows:

$$F_{net} = Am \cdot (P2-P0) - A_f (P2-P2)$$

In order to maintain a self-locking action, a net force $F_{net} \geq 0$ is required. Such a net force is caused by the inventive area ratio.

It has been find out that the above requirements may be fulfilled, if the effective surface Am of the holding structure 202 is made larger than the effective surface Af of the closing element 200. In such a case, the force K1 exerted onto the closing element 200 by the outlet pressure P2 is less than the force K2 exerted onto the holding structure 202, such that a net force results in the upward direction which provides a closing action.

In order to achieve the desired area ratio, various possibilities are conceivable. For example, a valve flap fixed at one side thereof might be shortened at the fixing location in order to accommodate a reduced effective surface of the valve flap as compared to the holding diaphragm. In the microvalve shown in FIG. 4b (with the piezoelectric actuator 114 not being provided as a rule in accordance with the invention) this might be implemented by elongating the stationary area of the flap chip 102 adjoining the outlet 130 to the right side such that the length of the valve flap is shortened. What is disadvantageous about this solution is, however, that, as a result of this, a dissymmetry regarding the attack points of the plunger 116 and torque forces resulting therefrom might be generated.

A preferred solution for achieving the above area ratio consists in using a valve flap fixed at two sides thereof and to shorten the same on both fixed sides.

Figure 6:
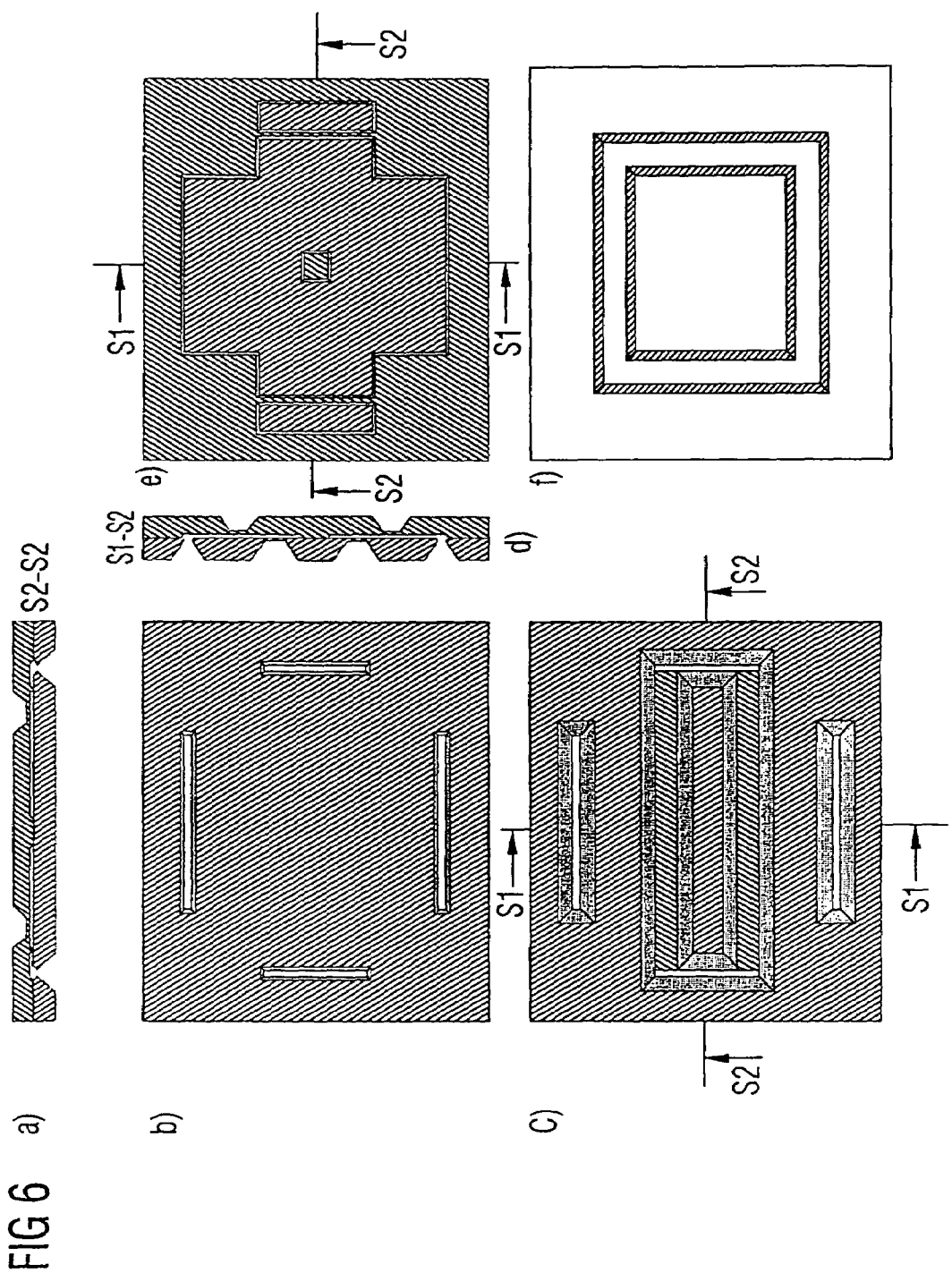
FIG. 6 shows a composition of FIG. 6a to 6f, which show schematic views of an embodiment of an inventive microvalve.

With reference to FIGS. 6 and 6a to 6f, a preferred embodiment of an inventive microvalve will now be explained in detail. FIG. 6 shows a compilation of the partial views shown in FIG. 6a to 6f.

The represented microvalve includes a two-layer structure with a diaphragm layer 300 and a flap layer 302. The two layers 300 and 302 may, for example, be formed by means of two-side structured silicon wafers, which are bonded (fusion bond) after structuring the same. However, it is clear that the two layers do not have to consist of silicon, but may alternatively consist of plastic and may be structured by means of hot-stamping or injection molding. The plastic layers may then be connected by gluing by means of adhesive material, by etching by means of solvents and by gluing together by laser welding or ultra-sonic welding. Again, the two layers may alternatively consist of metal, be structured by stamping, punching, milling and the like, and may subsequently be connected by means of gluing or welding. Alternatively, combinations of the above-specified materials may be used for the diaphragm layer 300 and the flap layer 302.

In the preferred embodiments described below, the diaphragm layer and the flap layer are each made of silicon wafers, with the same, for the sake of clarity, being referred to as diaphragm chip 300 and flap chip 302. Further, the beveled edges shown in the Figures are typically for a KOH etching in silicon, with these beveled edges, however, not being necessary for the invention and not occurring in alternative technologies.

Figure 6A:
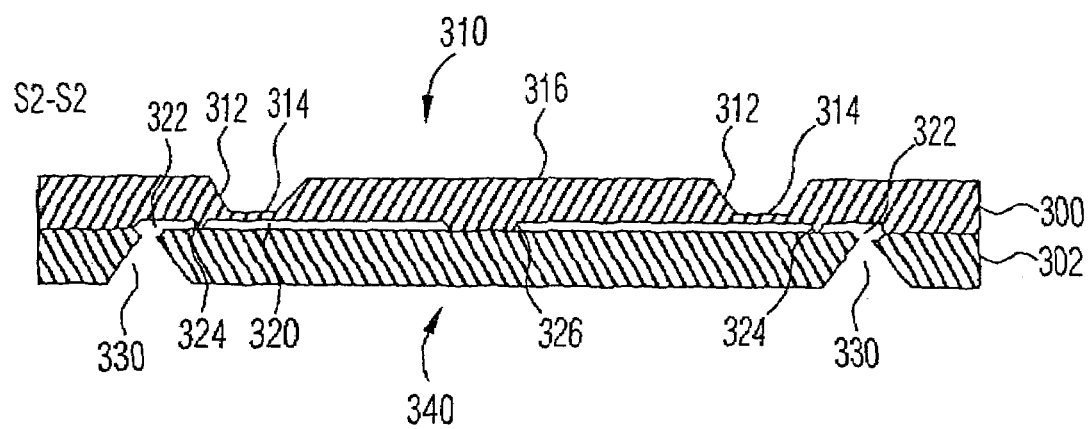
Figure 6D:
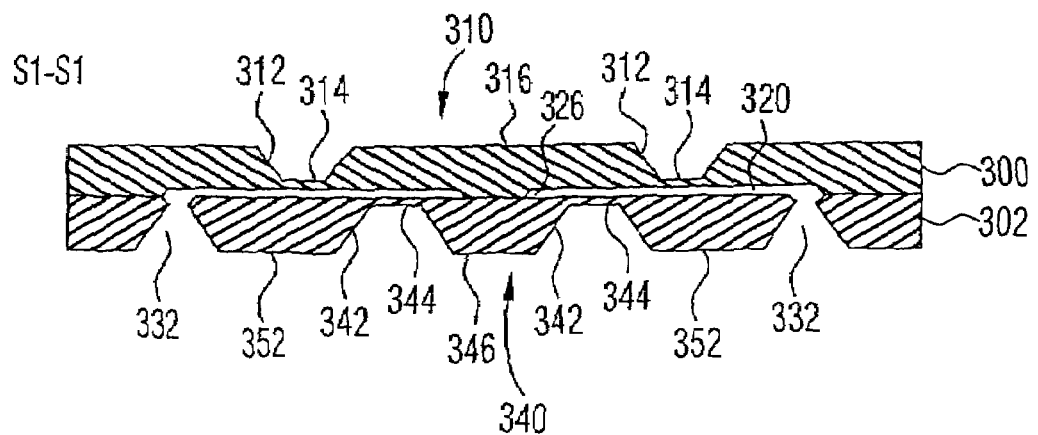
Figure 6B:
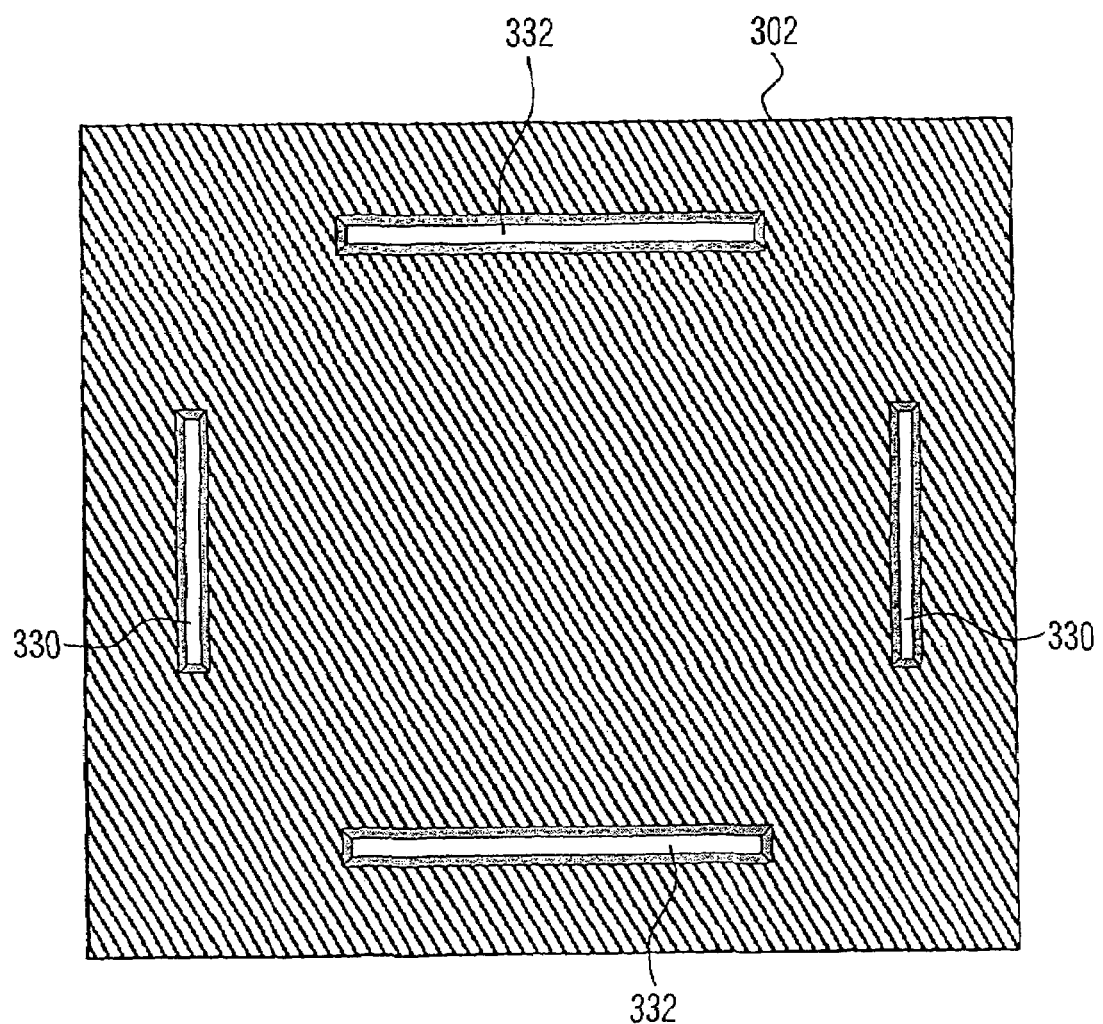
Figure 6C:
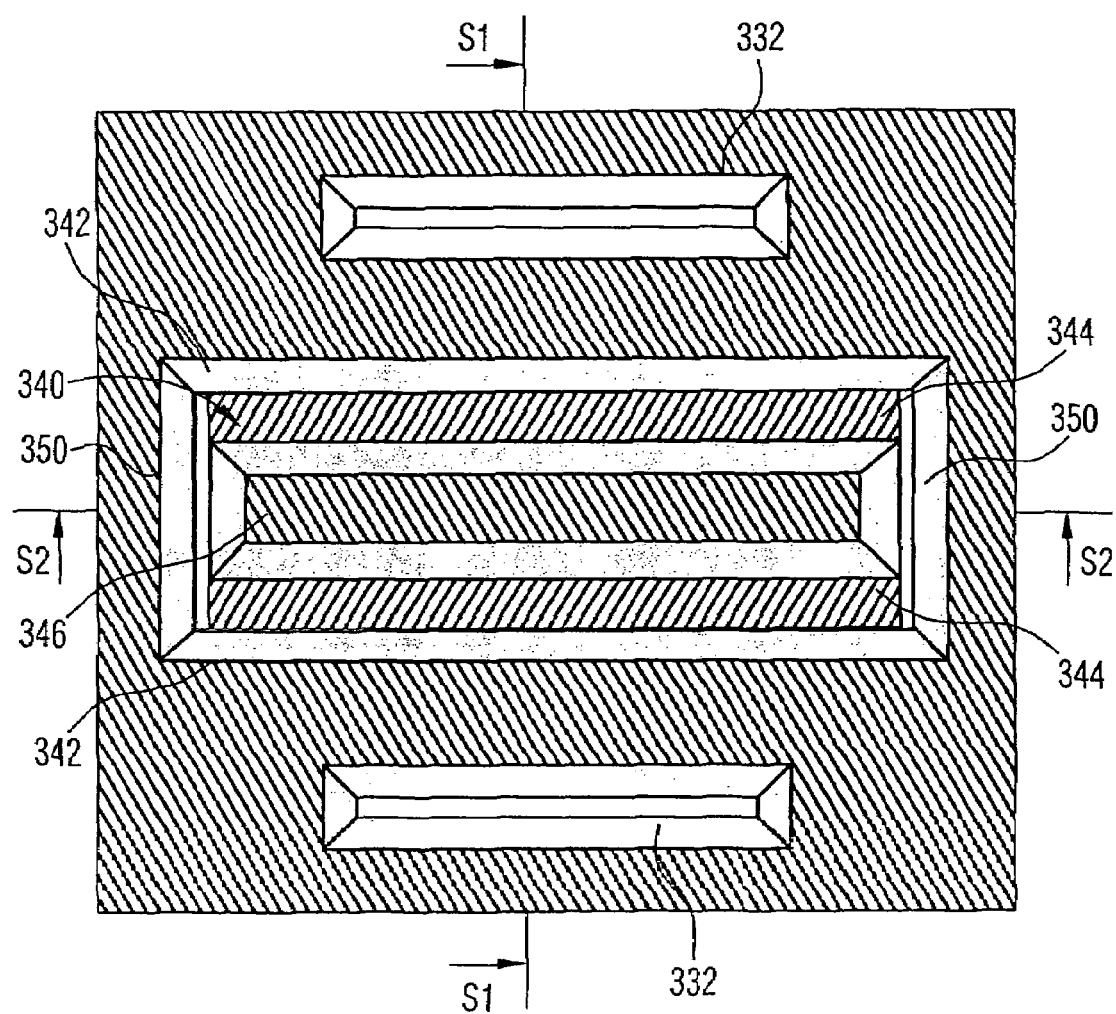
Figure 6E:
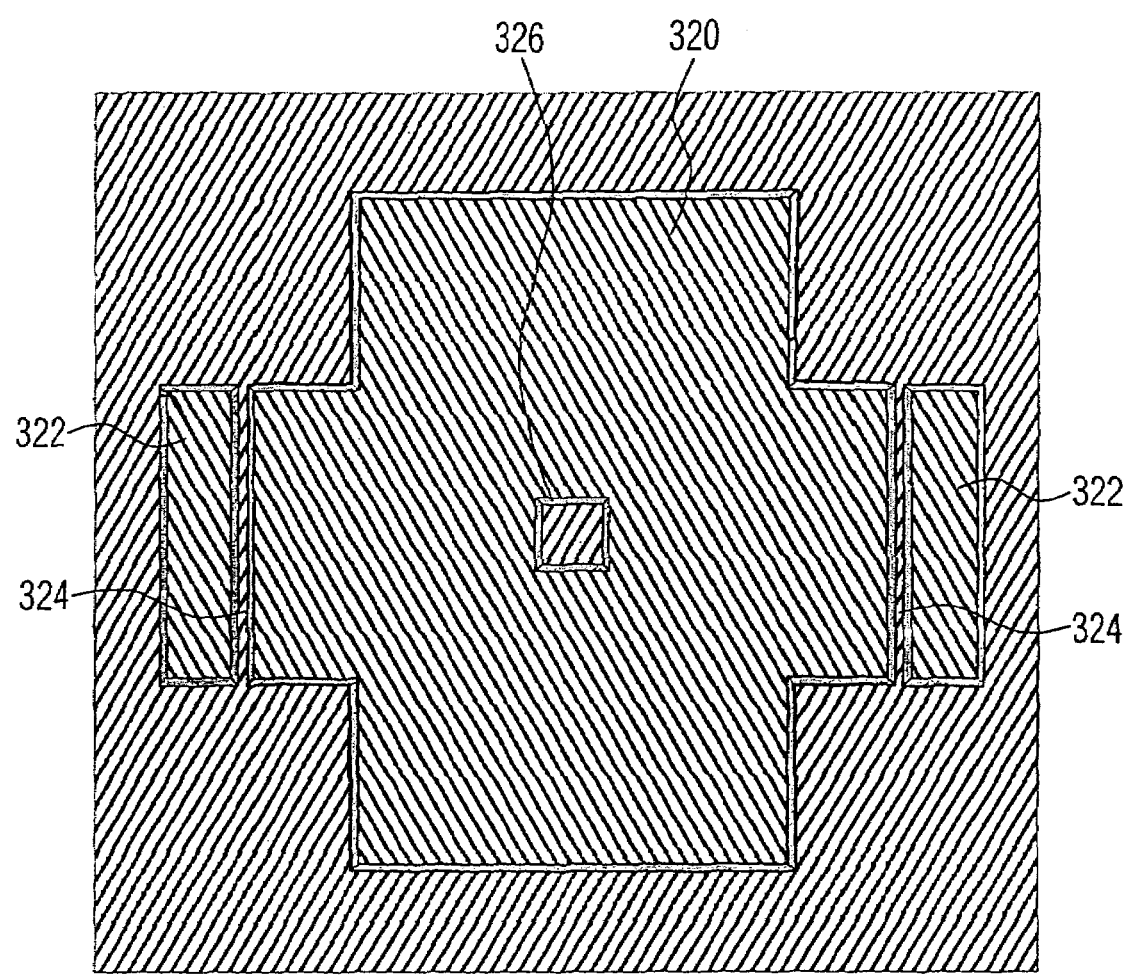
Figure 6F:
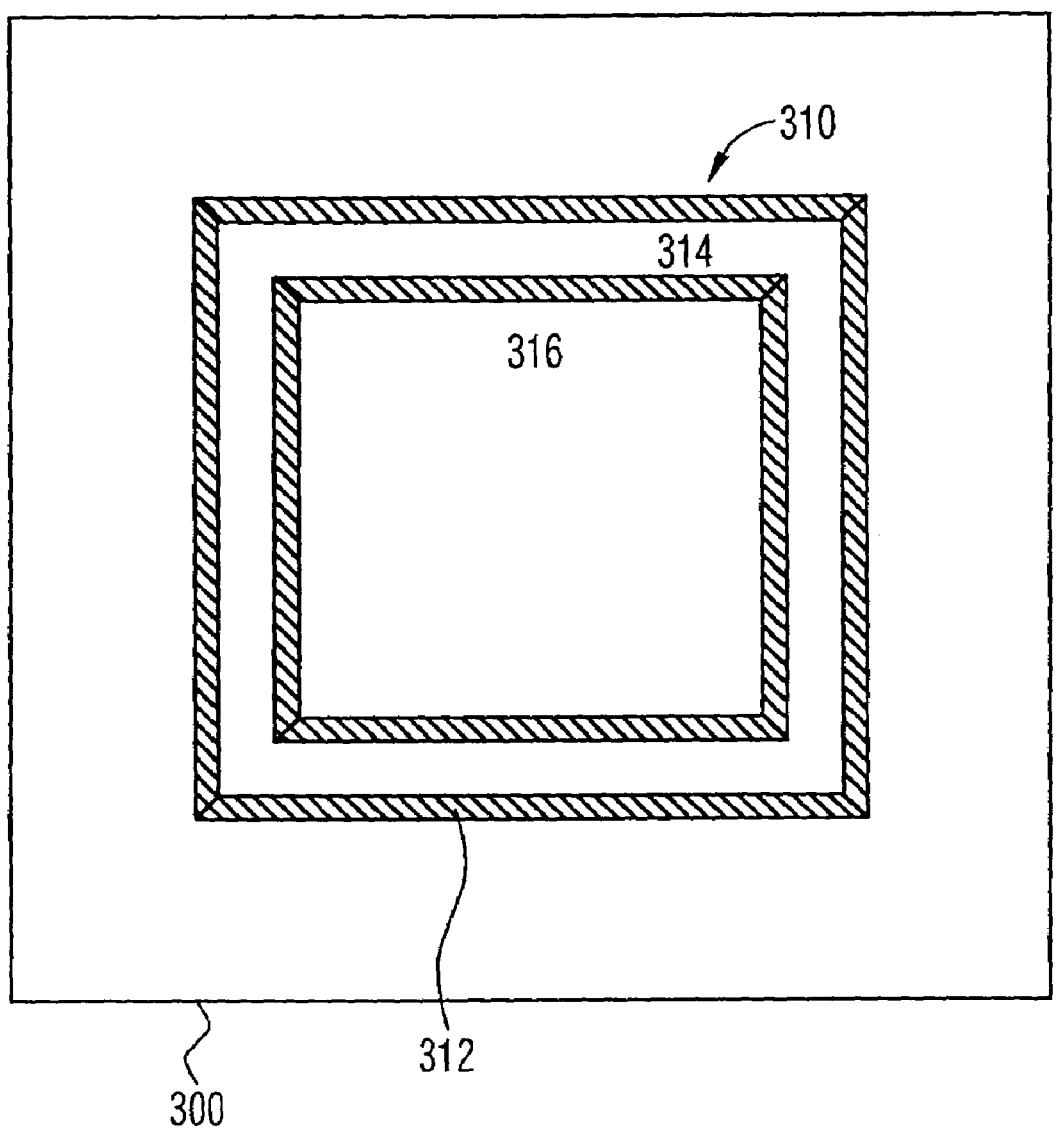

FIG. 6a shows a cross-sectional view along the line S2-S2 from FIG. 6c. FIG. 6b shows a plan view of the flap chip 302. FIG. 6c shows a bottom view of the flap chip 302. FIG. 6d shows a cross-sectional view along the line S1-S1 in FIG. 6c. FIG. 6e shows a bottom view of the diaphragm chip 300, and FIG. 6f shows a plan view of the diaphragm chip 300.

In the diaphragm chip 300, a deflectable holding structure 310 is structured in the shape of a stiffened diaphragm structure. In addition, a circumferential recess 312 is structured into the top side of the diaphragm chip 300, as is best seen in FIGS. 6a and 6f. The circumferential recess 312 defines diaphragm areas 314 and a stiffened area 316 of the diaphragm structure 310. Although the diaphragm structure 310 and the stiffening area 316 in FIG. 6f are essentially represented in a square shape, these areas may comprise different formed shapes in alternative embodiments. For example, the respective corners might be rounded in order to reduce any voltages arising there.

In the bottom side of the diaphragm chip 300, a valve chamber recess 320 (see FIG. 6e) is structured, which, together with the recess 312, establishes the thickness of the diaphragm areas 314. Further, inlet area recesses 322 are structured into the bottom side of the diaphragm chip 300 which are separated from the valve chamber recess 320 by respective sealing lips 324. Essentially centrically with respect to the stiffening areas 316 of the diaphragm structure 310, a plunger 326 is structured into the bottom side of the diaphragm chip 300, which serves as a connection piece for a stationary connection to a deflectable closing element. As will become clear hereinbelow, the shape of the recesses structured into the bottom side of the diaphragm chip 300 depends on the arrangement of inlet openings and outlet openings in the flap chip 302, with the shape to be recognized in FIG. 6e being only of an exemplary nature.

In FIG. 6b, which is a plan view of the flap chip 302, two inlet openings 330 and two outlet openings 332 can be seen, which are penetratingly formed into the flap chip 302. As can be best seen in FIGS. 6a and FIG. 6d, the inlet openings 330 and/or outlet openings 332 are each formed by etching the top side of the flap chip 302 for a short time and by an extended etching of recesses in the bottom side of the flap chip 302.

The inlet openings 330 are formed in the flap chip 302, to be arranged below the inlet area recesses 322 in the diaphragm chip, as can be seen in FIG. 6a. The outlet openings 332 are provided in the flap chip 302, to be arranged below the valve chamber recess 320 and are in fluidic communication to the same.

FIG. 6c shows a bottom view of the flap chip 302 with the outlet openings 332 formed therein. Further, in the bottom side of the flap chip 302, a deflectable closing element 340 is structured as a stiffened diaphragm structure. Two elongated recesses 342 are formed to implement diaphragm-like carrier structures 344. Further, this results in a reinforcing area 346, which on two sides is fixed to the flap chip 302 by the diaphragm-like carrier structures 344. On each of the short sides of the closing element 340, recesses 350 completely penetrating the flap chip 302 are provided such that the closing element 340 is not fixed at the two short sides.

As can be seen in FIG. 6d, the immovable areas 352 of the flap chip 302 on both sides of the closing element 340, which is formed by the carrier diaphragm 344 and the reinforcing area 346, clearly reach below the holding structure 310 formed in the diaphragm chip 300. As a result, the surface of the closing element 340, which is effective as regards a pressure in the space between the diaphragm chip 300 and the flap chip 302, is smaller than the corresponding surface of the diaphragm chip 300. Thus, in the microvalve shown in FIG. 6a to 6f, the above-specified condition for a microvalve providing self-locking action in both directions is fulfilled.

The microvalve shown in FIG. 6 to 6f is passive, with its opening state merely depending on the applied pressures. The plunger 326 is fixedly connected to the stiffening element, with the plunger being preferredly deposited in a centric arrangement as regards the holding structure 310 and the closing element 340, in order to keep the torque forces at a minimum. In contrast, the sealing lips 324 are not connected to the closing element 340. A possible connection between the sealing lip and the closing element resulting during manufacture when connecting the diaphragm chip 300 to the flap chip 302 may be subsequently disconnected from the bottom side by etching.

As a result, the diaphragm chip and the flap chip are preferredly bonded via an oxide layer, which is generated by oxiding the surface of the diaphragm chip to be connected and/or the surface of the flap chip to be connected. A total connective layer of oxide may then comprise a thickness between 100 nm and 300 nm. In a subsequent etching step, using hydrofluoric acid, the oxide is then removed below the sealing lip(s) 324 to disengage the same from the flap chip. Since the plunger 326 comprises larger lateral dimensions than the sealing lips, it is not disengaged from the flap chip in this etching step, but remains fixedly connected to the same. If support elements are further provided between the diaphragm chip and the flap chip, as will be described later on with reference to FIG. 8b, the same must be implemented such that they are also disengaged from the respective joining partner in the above etching step.

In FIG. 6a to FIG. 6f, the inventive microvalve is represented in a pressureless state. In this state, the closing element 340 is seated on the sealing lips 324, such that the fluid outlets 332 are in a fluidic disconnection from the fluid inlets 330.

During operation, an inlet pressure P1 acts on the fluid inlet 330, while an outlet pressure P2 acts on the fluid outlet 332. Further, a reference pressure P0, which is, as a rule, the atmospheric pressure, acts from above onto the holding structure. Further, as will be explained in detail later on with reference to FIGS. 8a and 8b, the microvalve will be attached such to a carrier structure provided with fluid lines that the inlet pressure P1 acts on the closing element 340 from below. Since the inlet pressure acts onto the closing element 340 from below, the microvalve provides a self-locking action with an positive pressure at the inlet. Since, as has been discussed above, the effective surface of the closing element for a positive pressure at the valve outlet is smaller than the effective surface of the holding element, a positive pressure at the valve outlet causes a resulting total force onto the composition of closing element and holding structure, with this resulting total force finally acting in that the closing element is pressed onto the sealing lip, such that the valve chamber recess 320 is in fluidic disconnection from the inlet area recesses 322. Thus, there is no fluidic connection between the fluid inlet and the fluid outlet.

For the case of a negative pressure of the fluid outlet, a net force acting downwards onto the composition of closing element and holding structure, such that the closing element is lifted on both ends of the same from the respective sealing lips 324, such that the valve is in the opened state. This opening is effected in an analog manner to the opening of the prior art microvalve described above with reference to FIG. 4c, with the exception that no actuation element is required in accordance with the invention, but that the opening may only be effected by a negative pressure at the outlet end.

As regards a more detailed point of view including the involved pressures, reference is made to the following discussion as regards FIG. 8a to 11b.

Figure 7A:
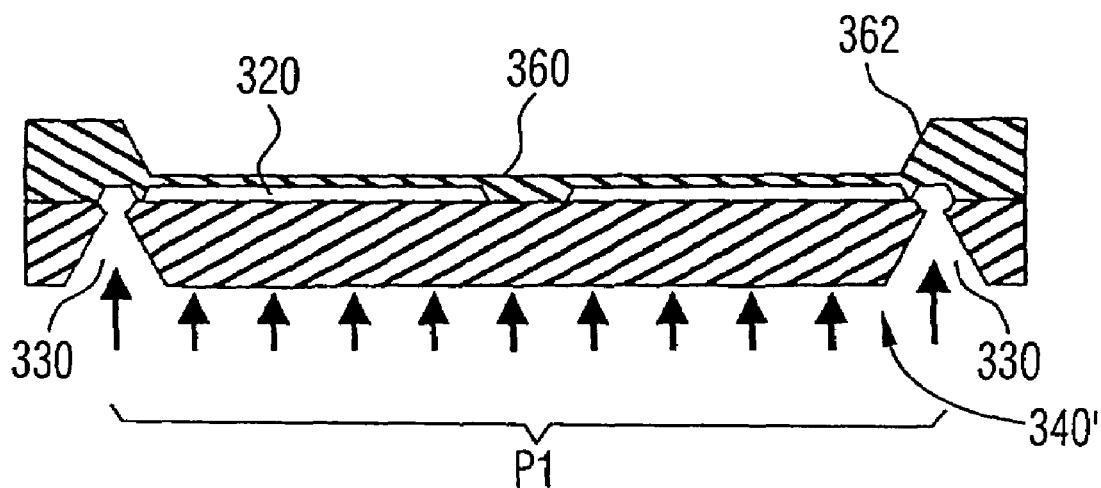
FIGS. 7a and 7b show schematic cross-sectional views of a further embodiment of an inventive microvalve.
Figure 7B:
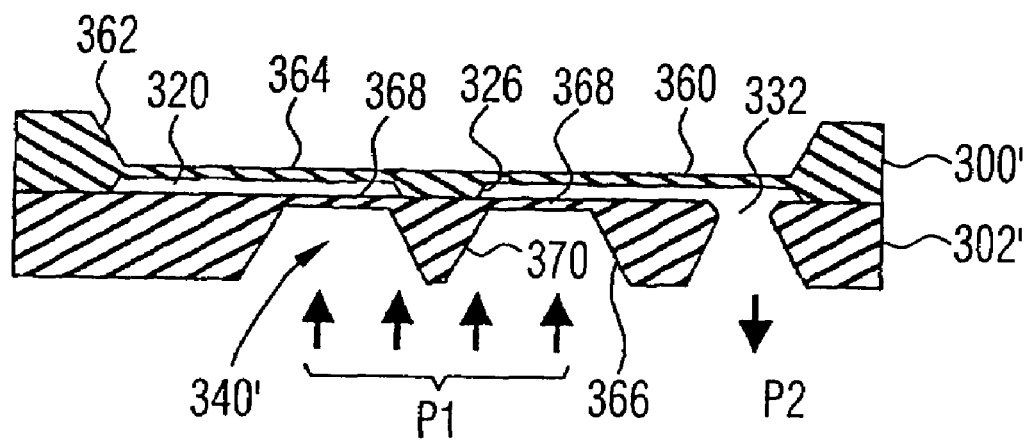

In FIGS. 7a and 7b, the schematic cross-sectional views of a first alternative embodiment of an inventive microvalve are shown, which differ from the embodiment shown in FIGS. 6a and 6b in that the holding structure is formed by a non-stiffened diaphragm element 360 and that only one outlet opening 332 is provided in the flap chip 302'. In order to realize the non-stiffened diaphragm structure, a planar recess 362 is formed in the diaphragm chip 300', which, together with a valve chamber recess 320 formed in the bottom side of the diaphragm chip 300', defines a diaphragm 364, on the bottom side of which a plunger 326 connected to a closing element 340' is formed. The closing element 340' is again structured by corresponding recesses 366 in the bottom side of the flap chip 302' in order to form diaphragm-like carrier structures 368 for a stiffening area 370 as compared to the embodiments described with reference to FIG. 6a to 6f.

In the embodiment shown in FIGS. 7a and 7b, the stiffening area 370 is more narrow and the diaphragm-like carrier structures 368 are wider than in the embodiments described with reference to FIG. 6a to 6f, such that the effective surface of the closing element 340' is further reduced.

The full-area flexibility of the holding structure of the embodiment described with reference to FIGS. 7a and 7b, however, reduces the effective surface of the holding structure as against a pressure prevailing in the valve chamber. Therefore, it is advantageous, as has already been discussed above with reference to FIG. 6a to 6f, to stiffen both the flap fixed on two sides thereof and the diaphragm of the holding structure in the center to achieve an optimum influence of force.

Figure 8A:
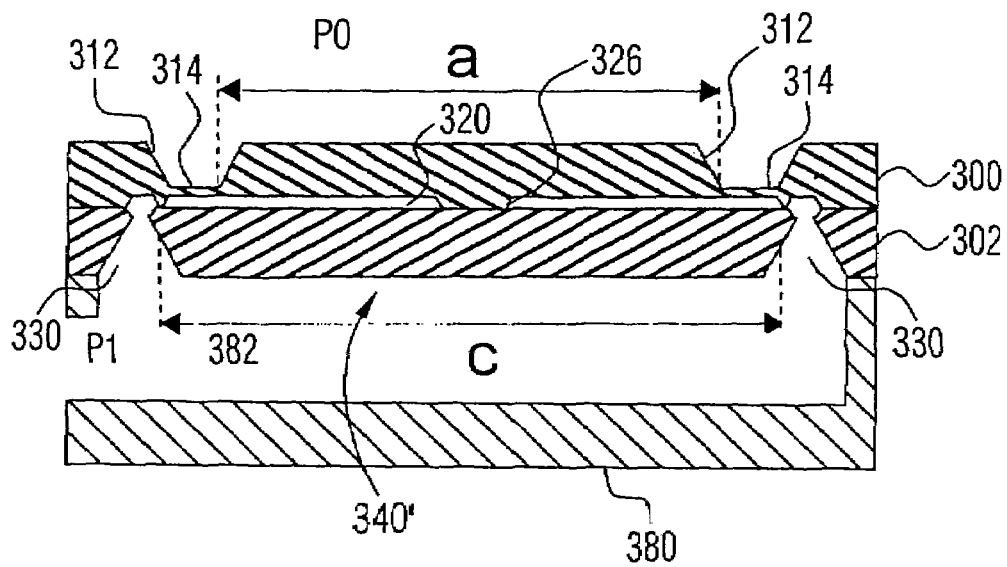
FIGS. 8a and 8b show schematic cross-sectional views of a further embodiment of an inventive microvalve.
Figure 8B:
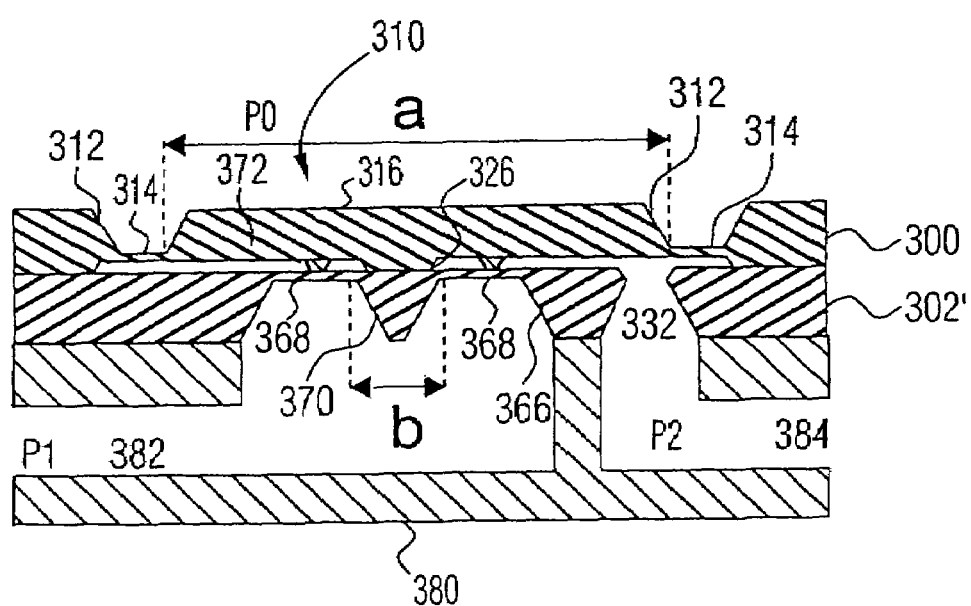

An embodiment of the present invention, in which both the flap and the holding structure are implemented as a stiffened diaphragm and which only comprises one outlet opening is shown in FIGS. 8a and 8b. This embodiment differs from the embodiment shown in FIGS. 7a and 7b only in that the diaphragm of the holding structure is stiffened. The diaphragm chip of the embodiment shown in FIGS. 8a and 8b may therefore essentially correspond to the embodiment described with reference to FIG. 6a to 6f, with like reference numbers being used for like elements. In contrast, the flap chip essentially corresponds to the embodiment shown in FIGS. 7a and 7b, with like reference numbers being once more used for like elements.

Moreover, a carrier structure 380 is shown in FIGS. 8a and 8b, which comprises an inlet fluid channel 382 and an outlet fluid channel 384. Across the inlet fluid channel 382, an inlet pressure P1 is applied to the fluid inlets 330, while across the fluid outlet channel 384 an outlet pressure P2 is applied to the fluid outlet 332. The carrier element 380 may be formed in the usual manner by means of a fluidic plate with corresponding lines.

Further, in FIGS. 8a and 8b, the dimensions required for determining the effective surface of the respective elements are indicated, with an essentially square holding structure 310 having an edge length a and a closing element having a length c and a width b being assumed. In the stiffened diaphragm-like structures, the stiffened areas 316 and/or 370 may be effectively counted among the effective surfaces, which are calculated as follows:

$Af = b \cdot c$; and $Am = a \cdot a$.

As a result, Af is the effective surface of the closing element and Am is the effective surface of the holding structure.

In the above definitions of the effective surfaces Af and Am, use was again made of the lengths a and b. An exact FEM analysis shows that the effective lengths of a and b are somewhat longer than outlined in the drawing, since the effective force partially also acts on the thinned suspensions of the holding structure and the flap structure.

The influence of the diaphragm areas on Af and Am is the less, the more flexible the diaphragm areas are. The flexibility of the diaphragm areas is, however, subjected to limitations, since, in all operating states of the microvalves, the fracture stress of the diaphragm material must not be exceeded.

As specified above, the inventive microvalves are implemented such that the effective surface Am is greater than the effective surface Af.

Deviating from the above embodiments, the closing element might also be implemented as a diaphragm without any stiffening. However, a partial stiffening of the flap, i.e. of the closing element, may be advantageous in that leaking rates are avoided and/or reduced by deforming of the flap rims.

Figure 9A:
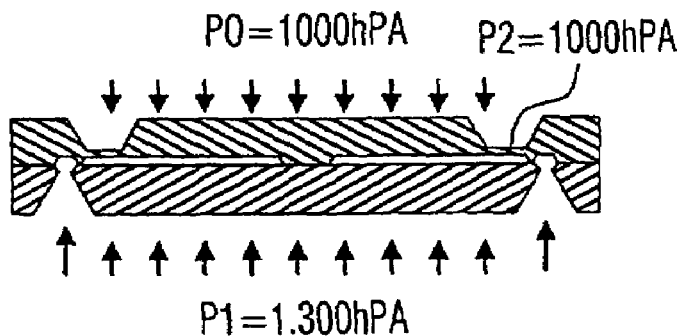
FIGS. 9a, 9b, 10a, 10b, 11a and 11b show schematic cross-sectional views for explaining the functionality of an inventive microvalve.
Figure 9B:
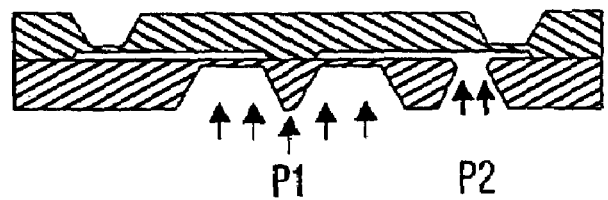

With reference to FIG. 9a to 11b, the double-self-locking performance of the valve shown in FIGS. 8a and 8b is described. As a result, FIGS. 9a and 9b show a case of a positive pressure at the outlet. The reference pressure P0 corresponds to the atmospheric pressure, with the following assumption being made as an approximation that the atmospheric pressure be 1000 hPa. The inlet pressure P1 be 1300 hPa and the outlet pressure is to correspond to the atmospheric pressure. Thus, a positive pressure is present at inlet, which pushes the closing element to the sealing lips, such that the valve exhibits a self-locking function in this situation.

Figure 10A:
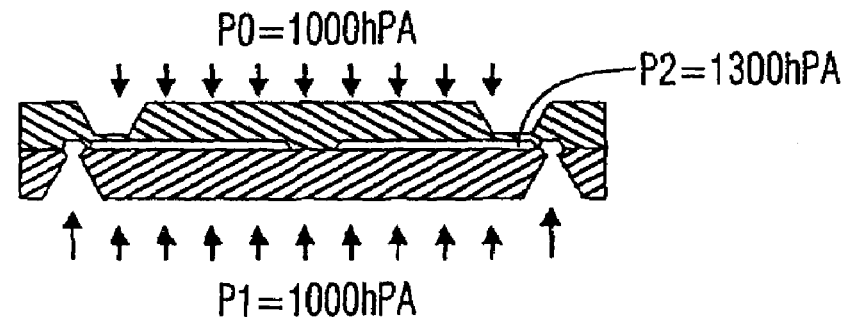
Figure 10B:
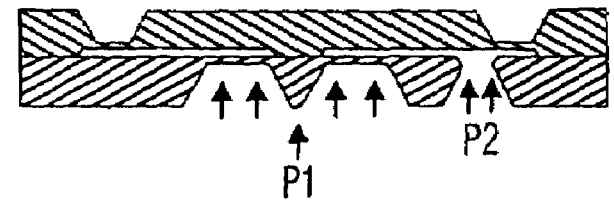

FIGS. 10a and 10b a situation is shown, in which a positive pressure prevails at the outlet. The reference pressure be again 1000 hPa (absolute), while a pressure of 1000 hPa is to be present at the inlet. A pressure P2 of 1300 hPa is to be present at the outlet. Since the surface of the holding structure which is operative for the outlet pressure P2 is greater than the one of the closing element, this positive pressure at the outlet also results in a self-locking function, this time in the reverse direction. It should be noted, that it is possible that low leakage rates may occur in this situation, since the suspensions of the flap composition might warp owing to the positive pressure in the pump chamber, such that, in the area of the suspensions, small leak passages might arise between the suspension area and the sealing lip. The situation illustrated in FIGS. 10a and 10b corresponds to the ratios during a pressure stroke of a pump, when the outlet is in fluidic communication to the pump chamber of a pump.

Figure 11A:
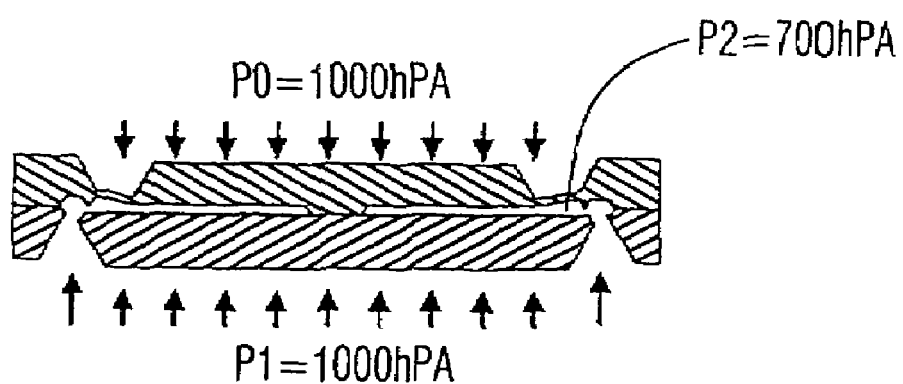
Figure 11B:
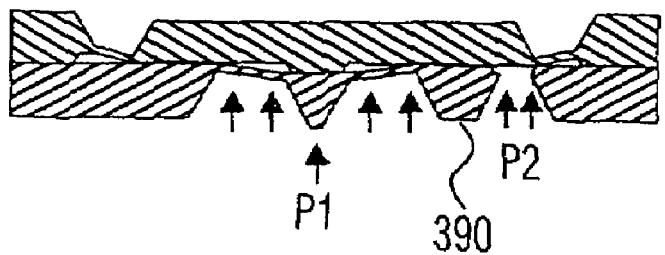

Finally, FIGS. 11a and 11b show the situation, where a negative pressure is present at the fluid outlet, with the reference pressure P0 being 1000 hPa, the inlet pressure P1 also being 1000 hPa, and the outlet pressure P2 also being 700 hPa. In this situation, the diaphragm-flap composition, which is formed by the composition of holding structure and closing element, is drawn downwards, such that the closing element is lifted from the sealing lip and the valve is open. This situation corresponds to the conditions during a suction stroke of a pump, but, starting from the situation in FIGS. 11a and 11b, a pressure compensation will take place by a follow-up stream of fluid into the inlet.

As may be recognized from FIG. 11b, the stroke of the holding structure is limited by the lower chip, with the stroke never being able to be higher than the valve chamber height. Such a mechanic stop for the stroke of the holding structure is advantageous, since only reduced mechanical stresses act on the same. However, the valve may only be opened to the maximum of the valve chamber height such that the flow resistance might get influenced as a result thereof. The valve chamber height itself is a freely selectable parameter, however, with the dead chamber volume increasing by a greater valve chamber height when the microvalve is used as an inlet valve in a micropump. The increased flow resistance caused by the stop of the holding structure at the closing element may be reduced, if one or several fluid channels running from the left to the right are provided in the stiffening area 390 of the closing element in FIG. 11b.

In order to prevent the valve flap suspension from bending upwards, when a positive pressure is present across the fluid inlet, support elements may be formed between the deflectable holding structure and the deflectable closing element in all embodiments of the inventive microvalve, which avoid an undesired bending of the closing element in a closed state. With reference to FIG. 8b, such support elements 372 may for example be structured to the right and to the left of the plunger 326, in the area of the diaphragm-like suspensions 368 into the bottom side of the diaphragm chip 300. These support elements 372 may at the same time be structured with the plunger and the sealing lip into the bottom side of the diaphragm chip 300 and may comprise the same height or a lesser height as the sealing lip and/or the plunger. These support elements, however, may not be fixedly connected to the flap chip 302'. The implementation of the support elements may be as desired, wherein the same may comprise the shape of a continuous ledge on each side of the plunger or the shape of individual posts.

The following is a more detailed reference to the interaction of the three pressures P0, P1 and P2. The reference pressure P0 will be, as a rule, the atmospheric pressure, with the reference pressure also allowing to be selected differently, if a defined pressure reservoir is applied to the space above the valve. The force balance indicates the following criterion for closing the valve:

$$P0 - P1 \cdot \beta < P2 \cdot (1-\beta)$$

comprising the surface ratio $$\beta = Af/Am < 1.$$

An analysis of a variation of the reference pressure P0 results in the following specified cases, with a value $\beta = 0.5$ being assumed for illustrative purposes.

If a reference pressure P0 is present, which corresponds to a vacuum outside the microvalve, P0>P1 results from the above criterion. Thus, the valve for all P1 and P2 is double-closed, meaning that the valve may not be opened. Expressed differently, this means that, if the reference pressure is set to vacuum, the valve may not be opened in any case.

For $0 < P0 < 0.5 \cdot P1$, the above criterion results in the following: P0>P2−P1.

This means that the valve for all P2 and P1 is double-closed. Even at a reference pressure which is smaller than half of the inlet pressure, the valve thus cannot be opened in any case.

For $0.5 \cdot P1 \leq P0 \leq P1$, i.e. $P0 = \alpha \cdot P1$, with $0.5 < \alpha \leq 1$, the above criterion results in: $P2 > P1 (2\alpha - 1)$. That is, that the valve remains closed, if P2 exceeds the value $P1 \cdot (2\alpha - 1)$. The valve will not open before a negative pressure P is present, which is less than $P1 \cdot (2\alpha - 1)$. Thus, if the reference pressure is smaller than P1, but greater than $0.5 \cdot P1$, the valve will not close before a negative pressure is present at the outlet.

In case the reference pressure is greater than the inlet pressure, i.e. P0>P1, the above criterion results: $P2 > 2 \cdot P0 - P1$: In this case, the outlet pressure P2 must exceed the inlet pressure P1 to close the valve. If thus the reference pressure is greater than P1, the valve can only be kept closed, if the outlet pressure P2 exceeds the inlet pressure P1.

Finally, considering the case in which the reference pressure is greater than the inlet pressure and greater than the outlet pressure, i.e. P0>P1 and P0>P2. In this case, the following applies: $P2 + P1 > 2 \cdot P0$. This inequation cannot be met for any inlet pressures and outlet pressures, such that the valve is in this case "double-open". For such a reference pressure the valve may thus not be closed.

A valve with the desired qualities may be provided by providing a means for adjusting the reference pressure acting from outside onto the holding structure. Such a means may, for example, be realized by means of a hermetically sealing cover, which is attached during the manufacture of the valve as a pressure reservoir onto the side of the holding structure facing away from the closing element of the holding structure, to provide a defined pressure of, for example, 700 hPa. Further, a fluid line may be connected to the side of the holding structure facing away from the closing element, such that, via the fluid line, a predetermined pressure may be exerted onto the holding structure so as to provide a pneumatic control for the microvalve. The inventive microvalve may also be implemented as a safety valve, which is open as long as a reference pressure acts from outside onto the holding structure, and which closes as soon as a corresponding reference pressure is no longer present, for example, by perforating a diaphragm or the like.

After now only the pressure ratios as regards the self-locking performance of the inventive microvalve have been discussed, the following describes the integration of such an inventive microvalve as an inlet valve in a micro-diaphragm pump with reference to FIG. 12a to 12e.

Such an inventive micro-diaphragm pump includes a diaphragm chip 400 and a flap chip 402, as is shown in FIG. 12b. The chips 400 and 402 may be manufactured from the same materials and by means of the same methods indicated above as regards the chips 300 and 302.

FIG. 12a shows a plan view of a diaphragm chip 400, FIG. 12b shows a sectional view along the line S3-S3 from FIG. 12a, FIG. 12c shows a sectional view along the line S4-S4 from FIG. 12a, FIG. 12d shows a sectional view along the line S5-S5 from FIG. 12a, and FIG. 12e shows a bottom view of the diaphragm chip 400.

In the left-side area of the micro-diaphragm pump, an inventive microvalve is realized, which, save for the following exemption, corresponds, for example, to the embodiment described with reference to FIGS. 8a and 8b. In the flap chip 402, no fluid outlet is provided in the micropump shown in FIG. 12a to 12e, but rather a fluid outlet 404 is structured into the diaphragm chip. The fluid inlet and the closing element 340' are once more (as compared to FIGS. 8a and 8b) adjusted to be subject to application of an inlet pressure P1 via a fluid line which may be provided in a carrier element.

In the top side of the diaphragm chip 400 a recess 410 is further formed for generating a pump diaphragm 412. On the pump diaphragm an actuator 414 is provided, for example in the form of a piezoelectric ceramics, which, together with the diaphragm 412, defines a piezo bending converter. As can be seen in FIG. 12e, the bottom side of the diaphragm chip 400 is structured to define, together with a recess in the surface of the flap chip 402, a pump chamber 406. The additional depression of the pump chamber into the surface of the flap chip 402 thus serves to achieve a better compression ratio. For this purpose, the depression may be implemented in the shape of circle, as is indicated by the dotted line 416 in FIG. 12a, in order to be adjusted to the deflection of the pump diaphragm, such that a maximum displacement of the pump chamber volume results when deflecting the pump diaphragm 412 downwards. Here, it should be noted that the dotted circle in FIG. 12a is merely an illustrative representation in the sense of a transparent image, since the same itself is part of the flap chip 402.

At the outlet of the micro-diaphragm pump, a non-return valve 430 is provided. As the inlet valve and the pump chamber area, the non-return valve 430 is also formed at the outlet by means of corresponding structurings of the diaphragm chip 400 and the flap chip 402. In addition, in the bottom side of the diaphragm chip 400, a valve chamber 432 is formed, which is in fluidic communication to the pump chamber 406. The valve chamber 432 is separated by means of a sealing lip 434 from an outlet area 436, which is also structured into the bottom side of the diaphragm chip 400. In the flap chip 402, a valve flap 437 is structured. In the shown embodiment, the valve flap 437 is a valve flap fixed on three sides thereof, which is fixed on three sides of the same by means of diaphragm-like structures 438, 440 and 442. On a fourth side, the valve flap 437, which, as is to be seen in FIGS. 12b and 12d, comprises a stiffening area 444, is not fixed, but adjoins an outlet 446 of the micro-diaphragm pump. In case of a positive pressure in the pump chamber 406 and thus in the valve chamber 432, the valve flap 436 lifts from the sealing lip 434, such that a fluid flow from the pump chamber may occur to the outlet 436. Vice versa, the valve 430 provides a locking action at a pressure P3, i.e. in case of a positive pressure.

As is shown in FIG. 12d, the pressure P3 at the outlet acts onto the valve flap of the non-return valve represented there. It is clear that, for this purpose, the micropump may be correspondingly attached to a carrier element which has an outlet fluid line mouthing at the outlet 436 and the non-return valve, such that the pressure P3 acts as stated above.

Figure 1A:
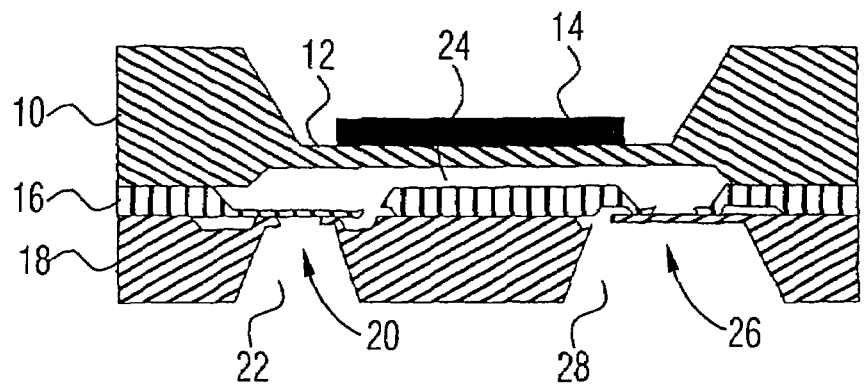
FIG. 1a to 1c show schematic cross-sectional views of a prior art micro-diaphragm pump with passive non-return valves.
Figure 1B:
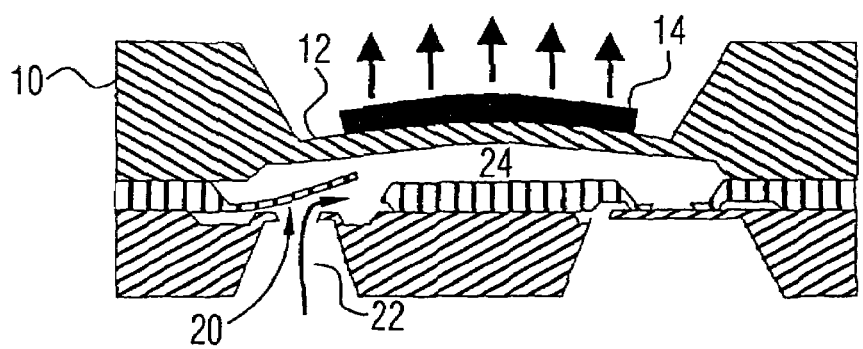
Figure 1C:
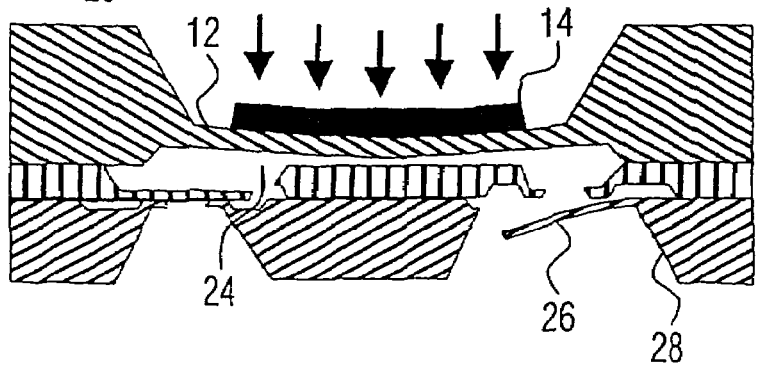

As an alternative to the described non-return valve 430, the outlet valve of the inventive micro-diaphragm pump might also be used by a conventional non-return valve, as described above with reference to FIG. 1a to 1c.

With the micropump described above with reference to FIG. 12a to 12e, the double-self-locking inventive microvalve is operative at the outlet to essentially prevent any backflow through the inlet openings, when a positive pressure is present in the pump chamber 406, which is in fluidic communication to the fluid outlet 404 of the microvalve.

With reference to the Figures, preferred embodiments of the present invention were explained above in detail. Those skilled in the art should appreciate that numerous modifications exist as regards the embodiments described. In particular, structurings, which, in the above embodiments, are each formed into a surface of one of the chips, may also be formed by structurings in both surfaces of this chip and/or in the surface of the other chip connected to the chip in order to obtain the corresponding functionality. Apart from that, as has already been mentioned above, the respective recesses do not have to comprise the beveled shape typical for a structuring of silicon substrates using KOH etching. Rather, the respective structures may comprise different forms, in particular, if the inventive microvalve and/or the inventive micro-diaphragm pump are implemented by different materials than silicon, for example plastic or metals.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. Normally closed passive microvalve, comprising:
   a fluid inlet;
   a fluid outlet;
   a deflectable closing element, which, in the closed state of the microvalve, is seated on a sealing lip, such that the fluid inlet is fluidically disconnected from the fluid outlet, and, in the opened state of the microvalve, is spaced apart from the sealing lip; and
   a deflectable holding structure, which is mechanically connected to the deflectable closing element, such that, between the same, a space exists, which is in fluidic communication to the fluid outlet,
   wherein an influence of force onto the deflectable holding structure and the deflectable closing element in a first direction provides an opening action, and an influence of force onto the deflectable holding structure and the deflectable closing element in a second direction provides a closing action,
   with the fluid inlet and the deflectable closing element being arranged such that a positive pressure at the fluid inlet exerts a force into the second direction,
   wherein an effective area of the deflectable holding structure, which, when a pressure is applied to the fluid outlet, causes a force into the second direction, is greater than an effective area of the deflectable closing element, which, when a pressure is applied to the fluid outlet, causes a force in the first direction,
   wherein the deflectable holding structure comprises a stiffened diaphragm structure, and
   wherein the deflectable closing element and the deflectable holding structure are configured such that the deflectable closing element may be lifted from the sealing lip by a negative pressure applied to the fluid outlet.

2. Microvalve in accordance with claim 1, wherein the deflectable closing element comprises one of a stiffened and non-stiffened diaphragm structure.

3. Microvalve in accordance with claim 2, wherein the deflectable holding structure is a circumferentially fixed, stiffened diaphragm structure, and wherein the deflectable closing element has two fixed sides and is one of a stiffened and non-stiffened diaphragm structure.

4. Microvalve in accordance with claim 2, wherein the stiffened diaphragm structure of the deflectable holding structure comprises a greater area than the stiffened or non-stiffened diaphragm structure of the deflectable closing element.

5. Microvalve in accordance with claim 1, wherein the deflectable holding structure and the deflectable closing element are connected by means of a connection piece, which connects a central area of the deflectable holding structure to a central area of the deflectable closing element.

6. Microvalve in accordance with claim 5, wherein the deflectable holding structure is formed in a first layer and the deflectable closing element is formed in a second layer, with the fluid inlet, the fluid outlet, the sealing lip, the space and the connection piece are further structured in the first and the second layers wherein a first surface of the first layer is connected to a first surface of a second layer.

7. Microvalve in accordance with claim 1, wherein a plurality of support elements are formed between the deflectable holding structure and the deflectable closing element, the plurality of support elements prevent an undesired bending of the deflectable closing element when the microvalve is in a closed state.

8. Microvalve in accordance with claim 1, wherein the deflectable holding structure and the deflectable closing element are formed to be deflected by the respectively prevailing pressures, with no active actuator for the deflectable holding structure or the deflectable closing element being provided.

9. Microvalve in accordance with claim 1, wherein a reference pressure acting on the deflectable holding structure provides an opening-action, when a pressure is applied to the fluid outlet, which, as compared to the reference pressure, represents a negative pressure.

10. Microvalve in accordance with claim 1, having an adjuster for adjusting a reference pressure acting onto the deflectable holding structure.

11. Normally closed microvalve, comprising:
    a fluid inlet;
    a fluid outlet;
    a deflectable closing element, which, in the closed state of the microvalve, is seated on a sealing lip, such that the fluid inlet is fluidically disconnected from the fluid outlet, and, in the opened state of the microvalve, is spaced apart from the sealing lip; and
    a deflectable holding structure, which is connected to the deflectable closing element, such that, between the same, a space exists, which is in fluidic communication to the fluid outlet, wherein an influence of force onto the deflectable holding structure and the deflectable closing element in a first direction provides an opening action, and an influence of force onto the deflectable holding structure and the delectable closing element in a second direction provides a closing action, with the fluid inlet and the deflectable closing element being arranged such that a pressure at the fluid inlet exerts a force into the second direction, wherein an effective area of the deflectable holding structure, which, when a pressure is applied to the fluid outlet, exerts a force into the second direction, is greater than an effective area of the deflectable closing element which, when a pressure is applied to the fluid outlet, causes a force on the first direction, wherein the deflectable holding structure comprises a circumferentially fixed stiffened diaphragm structure, and wherein the microvalve comprises two fluid inlets at two non-fixed sides of the deflectable closing element and a sealing lip for each of the fluid inlets.

12. Microvalve in accordance with claim 11, wherein the deflectable closing element comprises two fixed sides, a fluid outlet is provided on at least one of the fixed sides.

13. Normally closed microvalve, comprising:
a fluid inlet;
a fluid outlet;
a deflectable closing element, which, in the closed slate of the microvalve, is seated on a scaling lip, such that the fluid inlet is fluidically disconnected from the fluid outlet and, in the opened stale of the microvalve, is spaced apart from the sealing lip; and
a deflectable holding structure, which is connected to the deflectable closing element, such that, between the same, a space exits, which is fluidic communication to the fluid outlet,
wherein an influence of force onto the deflectable holding structure and the deflectable closing element in a first direction provides an opening action, and an influence of force onto the deflectable holding structure and the deflectable closing element in a second direction provides a closing action,
with the fluid inlet and the deflectable closing element being arranged such that a pressure at the fluid inlet exerts a force into the second direction,
wherein an effective area of the deflectable holding structure, which, when a pressure is applied to the fluid outlet, exerts a force into the second direction, is greater than an effective area of the deflectable closing element, which, when a pressure is applied to the fluid outlet, causes a force in the first direction,
wherein the deflectable holding structure comprises a stiffened diaphragm structure
wherein the deflectable holding structure and the deflectable closing element are connected by means of a connection piece, which connects a central area of the deflectable holding structure to a central area of the deflectable closing element,
wherein the deflectable holding structure is formed in a first layer and the deflectable closing element is formed in a second layer, with the fluid inlet, the fluid outlet, the sealing lip, the space and the connection piece are further structured in the first and second layers with the first and second layers being connected at respective first surfaces of the same, and
wherein the sealing lip, the space and the connection piece are structured in a first surface of the first layer and the fluid inlet and the fluid outlet are structured in a second layer.

14. Pump assembly comprising an inlet microvalve and a micropump, wherein the inlet microvalve is formed by a microvalve in accordance with claim 1 and wherein the fluid outlet of the microvalve is fluidically connected to a pump chamber of the micropump.

15. Pump assembly in accordance with claim 14, wherein an outlet of the micropump is provided with a passive non-return valve.

16. Pump assembly in accordance with claim 15, wherein the inlet valve, a pump structures of the micropump, and the passive non-return valve provided at the outlet of the micropump are structured in two layers.

17. Pump assembly comprising an inlet microvalve and a micropump wherein the inlet microvalve and a pump structure of the micropump are structured in two layers, and
wherein the inlet in microvalve comprises:
a fluid inlet;
a fluid outlet;
a deflectable closing element, which, in the closed state of the microvalve, is seated on a sealing lip, such that the fluid inlet is fluidically disconnected from the fluid outlet, and, in the opened state of the microvalve, is spaced apart from the sealing lip; and
a deflectable holding structure, which is connected to the deflectable closing element, such that, between the same, a space exists, which is in fluidic communication to the fluid outlet,
wherein an influence of force onto the deflectable holding structure and the deflectable closing element in a first direction provides an opening action, and an influence of force onto the deflectable holding structure and the deflectable closing element in a second direction provides a closing action,
with the fluid inlet and the deflectable closing element being arranged such that a pressure at the fluid inlet exerts a force into the second direction,
wherein an effective area of the deflectable holding structure, which, when a pressure is applied to the fluid outlet, exerts a force into the second direction, is greater than an effective area of the deflectable closing element, which, when a pressure is applied to the fluid outlet, causes a force in the first direction, and
wherein the deflectable holding structure comprises a stiffened diaphragm structure.

* * * * *